United States Patent
Iwasaki

(10) Patent No.: US 9,037,130 B2
(45) Date of Patent: May 19, 2015

(54) VEHICLE-MOUNTED APPARATUS, METHOD OF CONTROLLING VEHICLE-MOUNTED APPARATUS, AND PROGRAM

(71) Applicant: JVC KENWOOD Corporation, Yokohama-shi (JP)

(72) Inventor: Rui Iwasaki, Tokyo (JP)

(73) Assignee: JVC KENWOOD CORPORATION (JP)

( * ) Notice: Subject to any disclaimer, the term of this patent is extended or adjusted under 35 U.S.C. 154(b) by 129 days.

(21) Appl. No.: 13/731,298

(22) Filed: Dec. 31, 2012

(65) Prior Publication Data
US 2013/0183957 A1  Jul. 18, 2013

(30) Foreign Application Priority Data

Jan. 18, 2012 (JP) .................................. 2012-008534

(51) Int. Cl.
| | |
|---|---|
| H04W 4/00 | (2009.01) |
| H04W 4/04 | (2009.01) |
| H04M 1/60 | (2006.01) |
| H04M 1/725 | (2006.01) |
| G07C 9/00 | (2006.01) |
| H04W 88/06 | (2009.01) |

(52) U.S. Cl.
CPC .............. H04W 4/046 (2013.01); H04W 88/06 (2013.01); H04M 1/6091 (2013.01); H04M 1/72577 (2013.01); G07C 9/00309 (2013.01); G07C 2009/00507 (2013.01); G07C 2009/00793 (2013.01)

(58) Field of Classification Search
CPC ....................................................... H04W 4/00
USPC ........................................ 455/420, 456.1, 418
See application file for complete search history.

(56) References Cited

U.S. PATENT DOCUMENTS

| | | | | |
|---|---|---|---|---|
| 2010/0201483 | A1* | 8/2010 | Nakajima et al. | 340/5.61 |
| 2010/0255953 | A1* | 10/2010 | McCullough et al. | 477/94 |
| 2011/0022256 | A1* | 1/2011 | Asada et al. | 701/22 |
| 2011/0195699 | A1* | 8/2011 | Tadayon et al. | 455/418 |
| 2011/0260831 | A1* | 10/2011 | Ieda et al. | 340/5.64 |
| 2012/0244877 | A1* | 9/2012 | Margalef et al. | 455/456.1 |

* cited by examiner

FOREIGN PATENT DOCUMENTS

JP     2002087184     3/2002

*Primary Examiner* — Jinsong Hu
*Assistant Examiner* — Jean Chang
(74) *Attorney, Agent, or Firm* — Cantor Colburn LLP

(57) ABSTRACT

A vehicle-mounted apparatus is mounted on a vehicle having a keyless entry unit which receives a signal instructing a keyless entry from a mobile terminal and performs a keyless entry process in response to the received signal. The vehicle-mounted apparatus includes; a communication unit which receives control information including manipulation information indicating manipulation content for controlling the vehicle-mounted apparatus and information specifying a mobile terminal, from the mobile terminal; a terminal determination unit which determines whether the mobile terminal which transmitted the control information is the mobile terminal used for the keyless entry; a manipulation acceptance determination unit which determines whether to accept manipulation specified by the manipulation information included in the control information received by the communication unit, according to the determination result of the terminal determination unit; and a processing unit which performs a process according to the determination of the manipulation acceptance determination unit.

6 Claims, 26 Drawing Sheets

FIG. 3

MANIPULATION PERMISSION/PROHIBITION TABLE 12d

| TARGET FUNCTION | MANIPULATION PERMISSION/PROHIBITION |
|---|---|
| NAVIGATION FUNCTION | PROHIBITED |
| AUDIO FUNCTION | PROHIBITED |
| DATA RECORDER FUNCTION | PERMITTED |
| ⋮ | ⋮ |

FIG. 10

WARNING

INSTRUCTION IS IGNORED

IT IS DANGEROUS TO MANIPULATE MOBILE TERMINAL WHILE DRIVING
PLEASE DO NOT MANIPULATE

FIG. 11

MANIPULATION PERMISSION/PROHIBITION TABLE 12d

| TARGET FUNCTION | | PERMISSION/ PROHIBITION |
|---|---|---|
| LARGE CLASSIFICATION | SMALL CLASSIFICATION | |
| CALL | INCOMING CALL USING HANDS-FREE, ... | PERMITTED |
| | OUTGOING CALL USING HANDS-FREE, ... | PROHIBITED |
| | ⋮ | ⋮ |
| AUDIO | ON, OFF, VOLUME ADJUSTMENT, ... | PERMITTED |
| | TUNING, ... | PROHIBITED |
| | ⋮ | ⋮ |
| ⋮ | | |

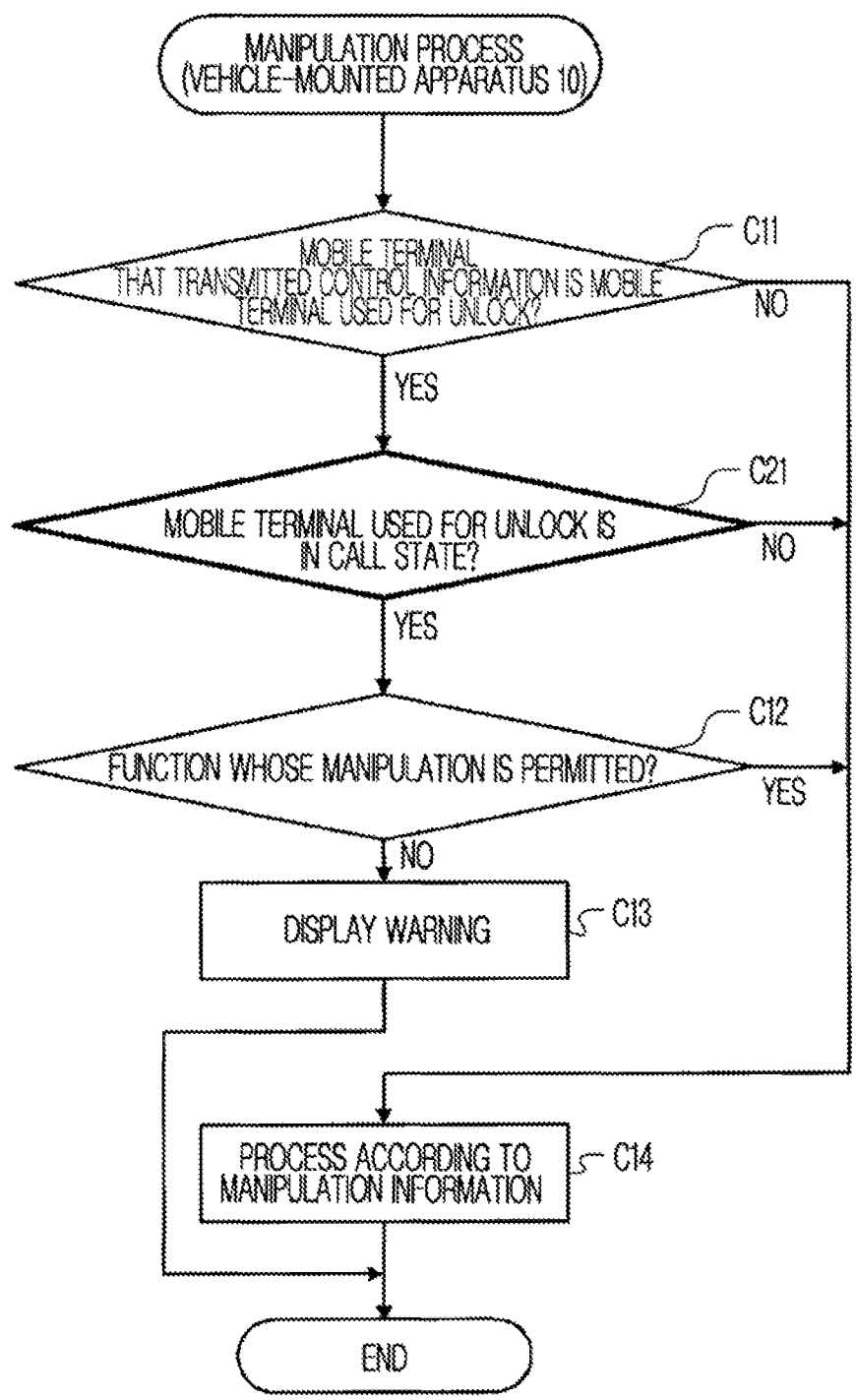

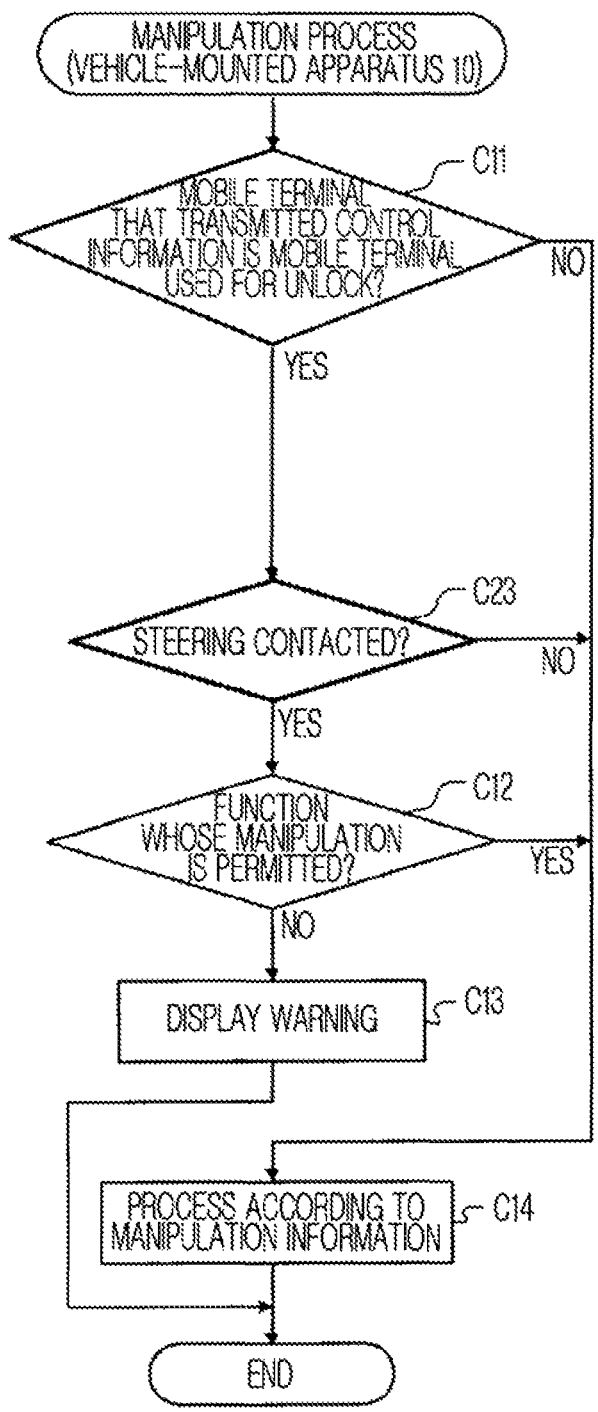

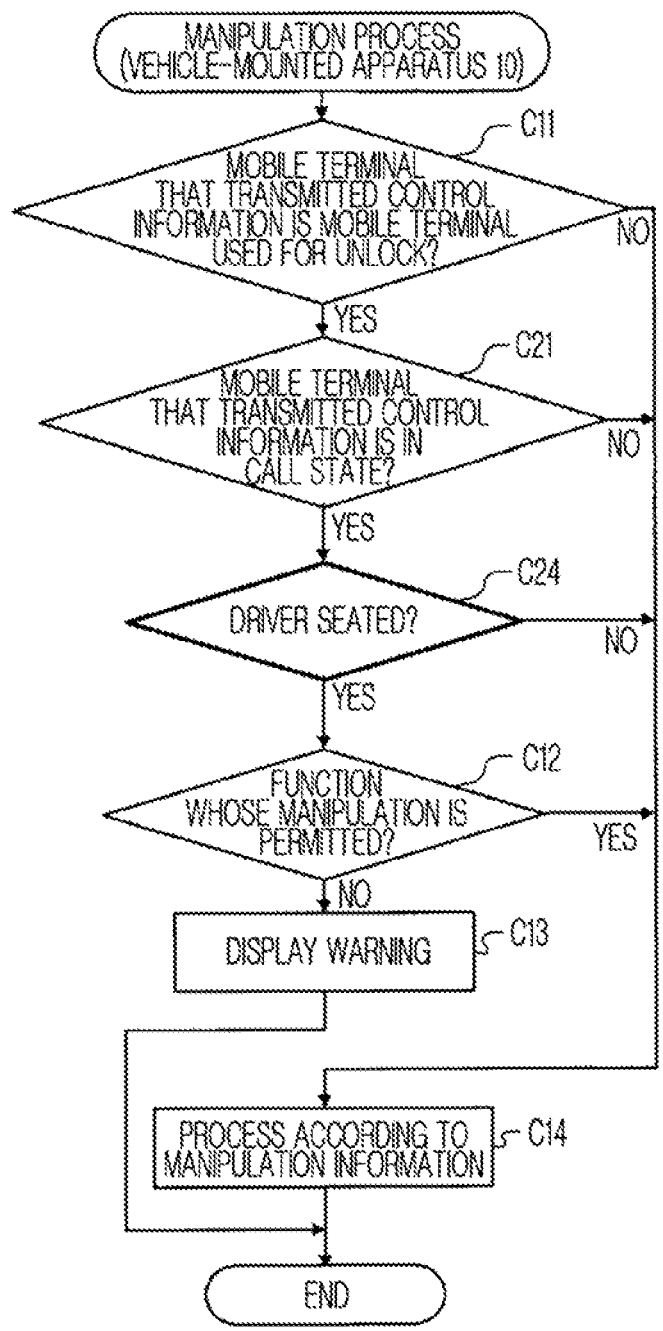

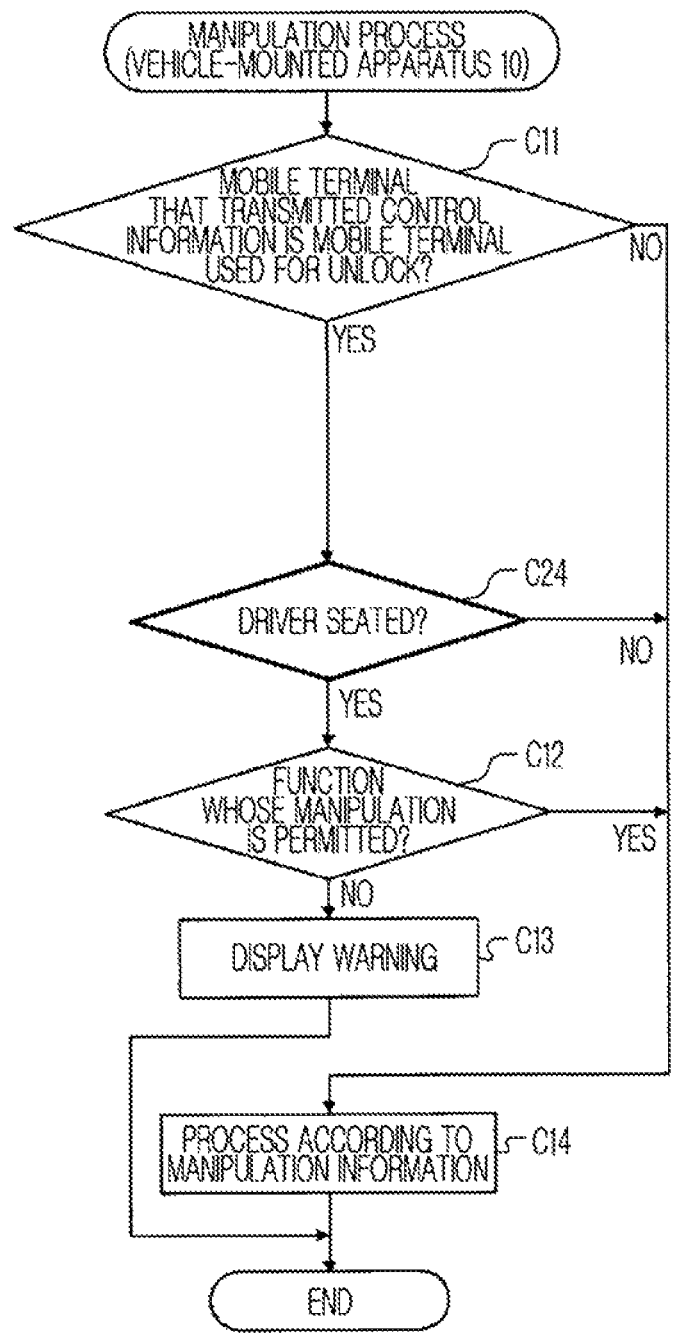

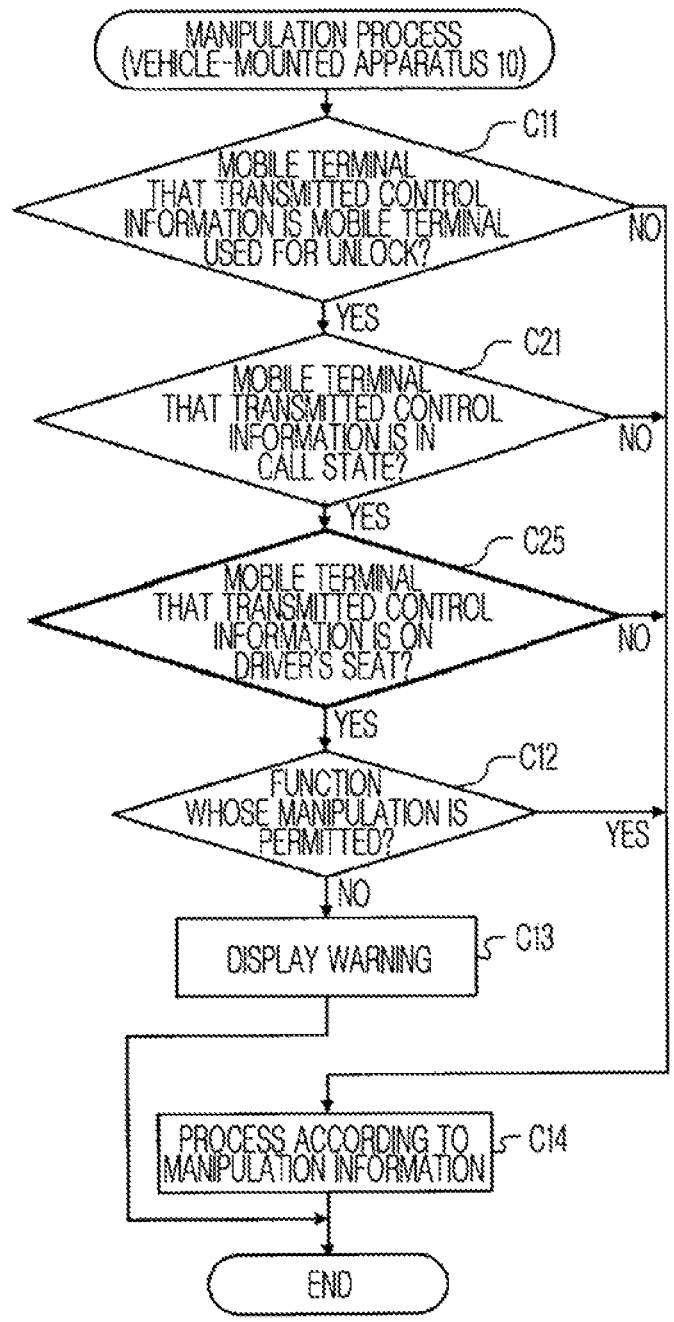

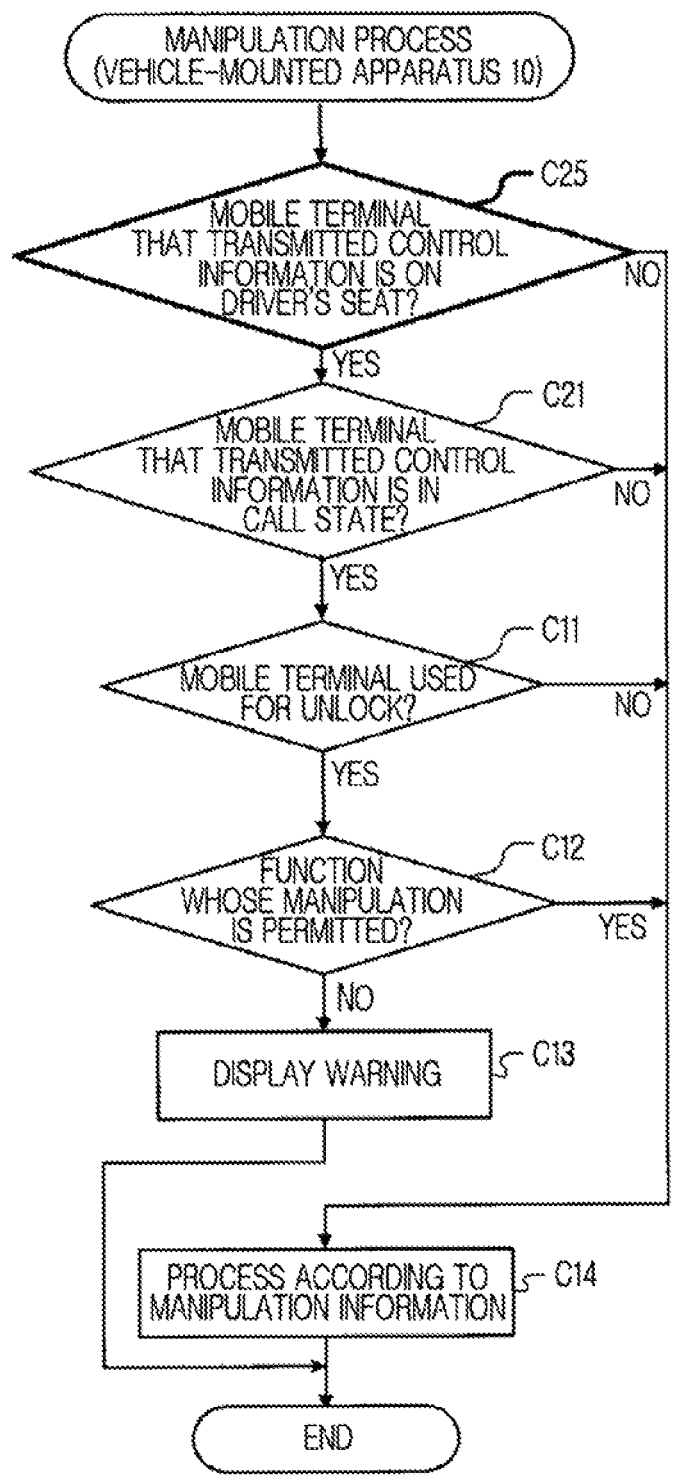

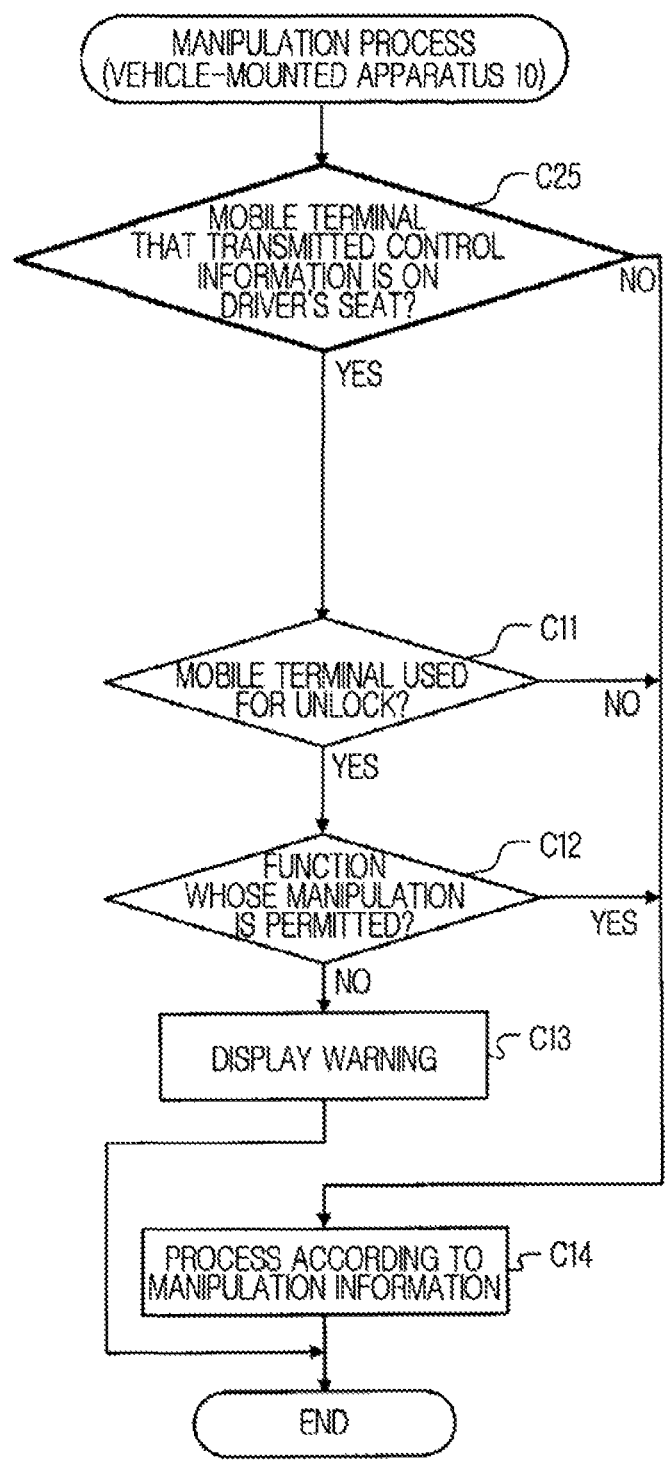

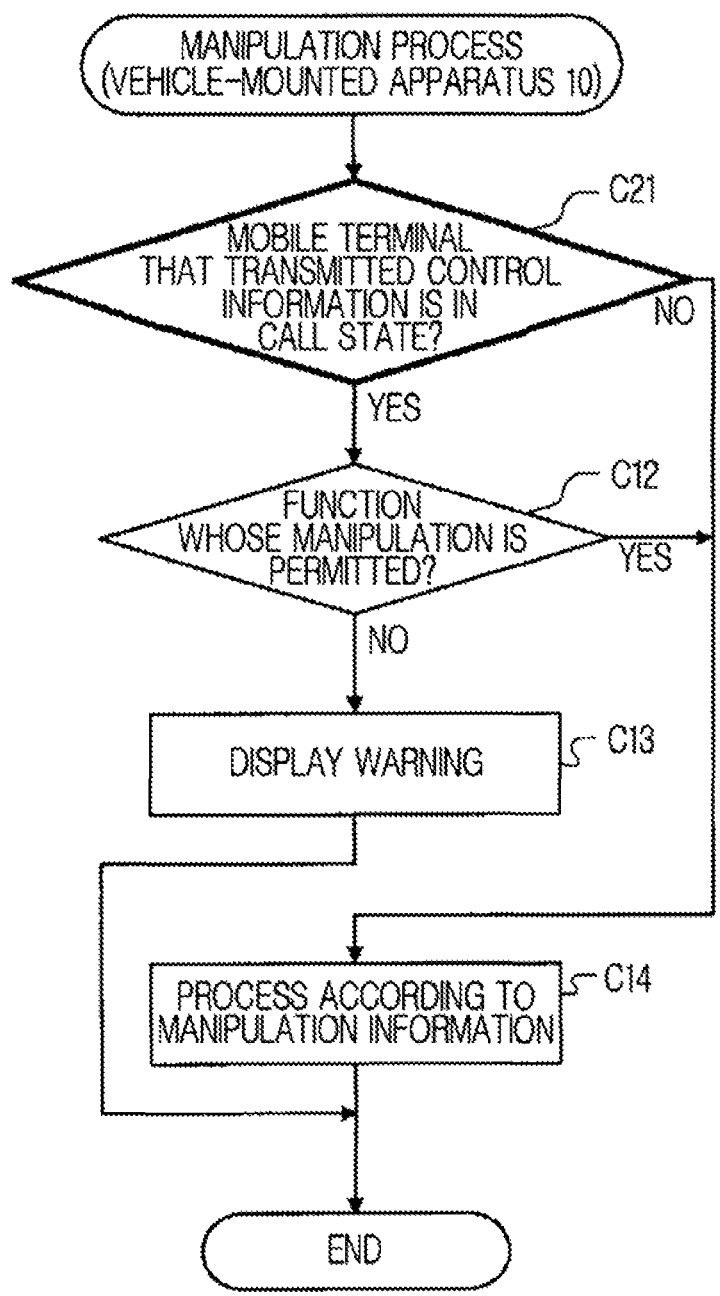

FIG. 20

| TARGET FUNCTION | | PERMISSION/ PROHIBITION | ADDITIONAL CONDITION |
|---|---|---|---|
| LARGE CLASSIFICATION | SMALL CLASSIFICATION | | |
| CALL | INCOMING CALL USING HANDS-FREE, ··· | PERMITTED | |
| | OUTGOING CALL USING HANDS-FREE, ··· | PROHIBITED | PERMITTED IF NOT DRIVING |
| | ⋮ | ⋮ | ⋮ |
| AUDIO | ON, OFF, VOLUME ADJUSTMENT, ··· | PERMITTED | |
| | TUNING, ··· | PROHIBITED | PERMITTED IF NOT DRIVING |
| | ⋮ | ⋮ | ⋮ |
| ⋮ | | | |

VEHICLE-MOUNTED APPARATUS, METHOD OF CONTROLLING VEHICLE-MOUNTED APPARATUS, AND PROGRAM

CROSS-REFERENCE TO RELATED PATENT APPLICATIONS

This application claims the benefit of Japanese Patent Application No. 2012-008534, filed on Jan. 18, 2012, in the Japan Patent Office, the disclosure of which is incorporated herein in its entirety by reference.

BACKGROUND OF THE INVENTION

1. Field of the Invention

The present invention relates to a vehicle-mounted apparatus, a method of controlling a vehicle-mounted apparatus, and a program.

2. Description of the Related Art

An automotive communication system that provides additional services by connecting a vehicle-mounted apparatus and a mobile terminal via a short-range wireless communication has been suggested.

Generally, the vehicle-mounted apparatus is connectable to a plurality of mobile terminals, and thus mobile terminals owned by a driver and a passenger may co-operate with the vehicle-mounted apparatus. An example of services provided by such a type of automotive communication system includes a service capable of controlling the vehicle-mounted apparatus by manipulating an application installed in a mobile terminal.

However, in a conventional automotive communication system, since the mobile terminal of the driver is also connected to the vehicle-mounted apparatus, the vehicle-mounted apparatus is manipulatable by the mobile terminal of the driver.

Accordingly, Patent Document 1 suggests an automotive communication system where a location of a mobile terminal in a vehicle is specified and a control aspect of a vehicle-mounted apparatus is set based on the specified location.

According to the technology disclosed in Patent Document 1, it is required to specify the location of the mobile terminal in the vehicle. In order to specify the location of the mobile terminal by using a location sensor or the like, a broadscale apparatus structure is required and reliability is low. When the location of the mobile terminal in the vehicle is specified by manipulation of a passenger, the manipulation is complicated, a use frequency is decreased, and at the same time, the generation of human error cannot be prevented. Accordingly, in a conventional technology, there are many cases where a passenger is unable to suitably manipulate a vehicle-mounted apparatus, for example, a driver is able to manipulate the vehicle-mounted apparatus by using a mobile terminal and a fellow passenger other than the driver is unable to manipulate the vehicle-mounted apparatus by using a mobile terminal.

(Patent Document 1) Japanese Laid-Open Patent Publication No. 2002-87184

SUMMARY OF THE INVENTION

The present invention is realized considering such circumstances, and aims at suitably controlling cooperation between a mobile terminal and a vehicle-mounted apparatus by using a simple structure.

According to an aspect of the present invention, there is provided a vehicle-mounted apparatus which is mounted on a vehicle having a keyless entry unit which receives a signal instructing a keyless entry from a mobile terminal and performs a keyless entry process in response to the received signal, the vehicle-mounted apparatus including: a communication unit which receives control information including manipulation information indicating manipulation content for controlling the vehicle-mounted apparatus and information specifying a mobile terminal, from the mobile terminal; a terminal determination unit which determines whether the mobile terminal that transmitted the control information is the mobile terminal used for the keyless entry; a manipulation acceptance determination unit which determines whether to accept manipulation specified by the manipulation information included in the control information received by the communication unit, according to the determination result of the terminal determination unit; and a processing unit which performs a process according to the determination of the manipulation acceptance determination unit.

According to another aspect of the present invention, there is provided a method of controlling a vehicle-mounted apparatus, the method including: receiving a signal instructing a keyless entry from a mobile terminal and performing a keyless entry process in response to the received signal; receiving control information including manipulation information indicating manipulation content for controlling the vehicle-mounted apparatus and information specifying a mobile terminal, from the mobile terminal; determining whether the mobile terminal that transmitted the control information is the mobile terminal used for the keyless entry; determining whether to accept manipulation specified by the manipulation information included in the received control information, according to the determination result; and performing a process according to the determination.

According to another aspect of the present invention, there is provided a is computer program for executing on a computer a computer process, the computer process including: receiving a signal instructing a keyless entry from a mobile terminal and performing a keyless entry process in response to the received signal; receiving control information including manipulation information indicating manipulation content for controlling a vehicle-mounted apparatus and information specifying a mobile terminal, from the mobile terminal; determining whether the mobile terminal that transmitted the control information is the mobile terminal used for the keyless entry; determining whether to accept manipulation specified by the manipulation information included in the received control information, according to the determination result; and performing a process according to the determination.

BRIEF DESCRIPTION OF THE DRAWINGS

The above and other features and advantages of the present invention will become more apparent by describing in detail exemplary embodiments thereof with reference to the attached drawings in which:

FIG. 3 is a diagram for showing an example of a manipulation permission/prohibition table stored in a vehicle-mounted apparatus;

FIG. 10 is a view for showing an example of a warning sign displayed by a vehicle-mounted apparatus;

FIG. 11 is a diagram for showing a modified example of a manipulation permission/prohibition table;

FIG. 12 is a flowchart of a manipulation process performed by a vehicle-mounted apparatus, according to a second embodiment;

FIGS. 14A and 14B are flowcharts of another manipulation process performed by a vehicle-mounted apparatus, according to the third embodiment;

FIGS. 15A and 15B are flowcharts of another manipulation process performed by a vehicle-mounted apparatus, according to the third embodiment:

FIGS. 16A and 16B are flowcharts of another manipulation process performed by a vehicle-mounted apparatus, according to the third embodiment;

FIGS. 18A and 18B are flowcharts of another manipulation process performed by a vehicle-mounted apparatus, according to the fourth embodiment;

FIGS. 19A and 19B are flowcharts of a manipulation process performed by a vehicle-mounted apparatus, according to a fifth embodiment; and FIG. 20 is a diagram of another modified example of a manipulation permission/prohibition table.

DETAILED DESCRIPTION OF THE INVENTION

1. First Embodiment

An automotive communication system according to a first embodiment of the present invention will now be described with reference to the drawings.

Figure 1:
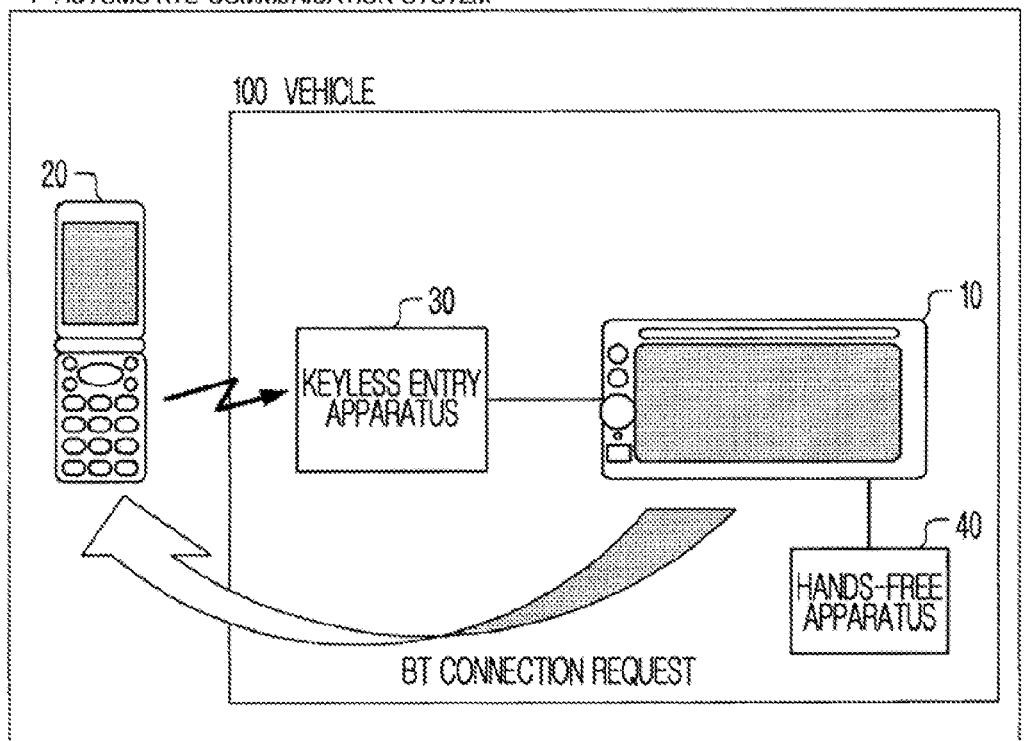
FIG. 1 is a diagram of a construction of an automotive communication system, according to a first embodiment.

An automotive communication system 1 according to the present embodiment includes, as shown in FIG. 1, a vehicle-mounted apparatus 10 mounted on a vehicle 100, a keyless entry apparatus (keyless entry unit) 30, a hands-free apparatus 40, and one or more mobile terminals 20 held by one or more passengers of the vehicle 100. The automotive communication system 1 performs various communications by establishing a communication connection (for example, short-range wireless connection) between the mobile terminal 20 that performed a keyless entry and the vehicle-mounted apparatus 10.

Figure 2:
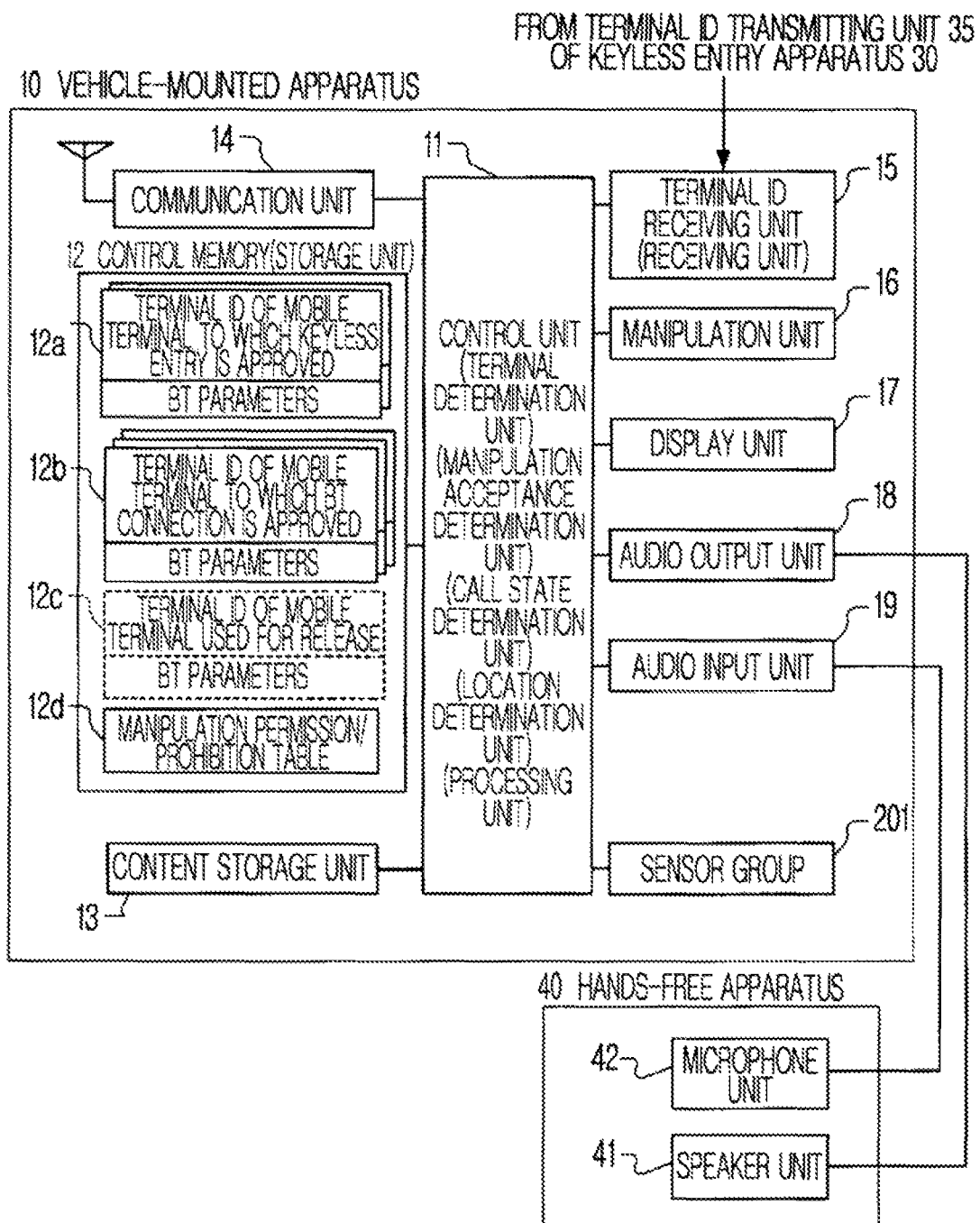
FIG. 2 is a block diagram of a vehicle-mounted apparatus and a hands-free apparatus.

The vehicle-mounted apparatus 10 is a vehicle-mounted audio apparatus, a vehicle-mounted navigation apparatus, or the like. As shown in FIG. 2, the vehicle-mounted apparatus 10 includes a control unit 11, a control memory 12, a content storage unit 13, a communication unit 14, a terminal identification (ID) receiving unit 15, a manipulation unit 16, a display unit 17, an audio output unit 18, an audio input unit 19, and a sensor group 201.

The control unit 11 includes a central processing unit (CPU), etc., and controls operations of each unit of the vehicle-mounted apparatus 10 by executing operation programs stored in the control memory 12. For example, the control unit 11 realizes a processing unit for performing a process of an audio signal, a process of a navigation signal, and a process of a display control, or the like, and performs various controls by establishing, for example, a Bluetooth (BT) connection with the mobile terminal 20 that requested a keyless entry to the keyless entry apparatus 30. Here, details about the controls will be described later. The control unit 11 realizes each determination unit (terminal determination unit, call state determination unit, manipulation acceptance determination unit, and a location determination unit) and a processing unit. Also, the control unit 11 may realize its functions by using a single CPU, a digital signal processor (DSP), or the like, or by using a plurality of CPUs, DSPs, or the like.

The control memory 12 includes a read only memory (ROM), a flash memory, a random access memory (RAM), or the like, and realizes a storage unit by functioning as a work area of a CPU which forms the control unit 11, a program area which stores operation programs executed by the CPU, a data area, or the like.

The program area of the control memory 12 stores operation programs, such as i) an operation program for performing an audio process or a navigation process, ii) a program for controlling various functions via manipulation of the mobile terminal 20 by establishing a BT connection with the mobile terminal 20 having a predetermined BT parameter, and iii) a program for receiving a terminal ID (identification information) of the mobile terminal 20 used for the keyless entry, from the keyless entry apparatus 30 and performing a control of not permitting a predetermined manipulation by the mobile terminal 20 specified by the terminal ID.

The data area of the control memory 12 stores, as shown in FIG. 2, i) a pair 12a of terminal IDs of the mobile terminals 20 to which a keyless entry is approved and various pieces of data (hereinafter, referred to as BT parameters), such as an address, required to establish a BT connection with the mobile terminal 20, ii) a pair 12b of terminal IDs of the mobile terminals 20 to which a BT connection is approved (for example, a mobile terminal 20 held by a person who is expected to get on the vehicle) and BT parameters for establishing a BT connection with the mobile terminal 20, and iii) a pair 12c of terminal IDs of the mobile terminals 20 actually used for a keyless entry and BT parameters required to establish a BT connection with the mobile terminal 20.

Here, the number of each of the pair 12a of the terminal ID of the mobile terminal 20 to which the keyless entry is approved and the BT parameters and the pair 12b of the terminal ID of the mobile terminal 20 to which the BT connection is approved and the BT parameters may be one or more. The number of the pair 12c of the terminal ID of the mobile terminal 20 actually used for the keyless entry and BT parameters is one.

Also, information indicating whether to permit or prohibit manipulation of each of a plurality of functions of the vehicle-mounted apparatus 10 by the mobile terminal 20 used for the keyless entry is registered in the data area, as shown in FIG. 3.

The content storage unit 13 includes a hard disk drive (HDD), a flash memory, or the like, and stores various types of content (audio contents, still image contents, moving image contents, etc.) reproduced by the vehicle-mounted apparatus 10.

The communication unit 14 includes an antenna and a BT module, and performs a BT connection (a wireless communication satisfying BT specifications) with another BT apparatus (in the present embodiment, specifically, the mobile terminal 20). The communication unit 14 is controlled by the control unit 11. Alternatively, a communication unit that performs a wired communication may be used. As a wired communication, a communication based on universal serial bus (USB) standards or high-definition multimedia interface (HDMI) standards may be used.

The terminal ID receiving unit 15 is connected to a terminal ID transmitting unit 35 of the keyless entry apparatus 30 described later via, for example, wires, receives a terminal ID transmitted from the terminal ID transmitting unit 35, and notifies the intent to the control unit 11. The terminal ID receiving unit 15 realizes a receiving unit according to a control of the control unit 11.

The manipulation unit 16 includes a manipulation button, a manipulation key, a remote controller, a touch panel, or the like, and supplies a signal indicating manipulation content to the control unit 11, in response to a manipulation by a user.

The display unit 17 includes a fluorescent lamp (FL) display, a liquid crystal display, or the like, and displays data under a control of the control unit 11.

The audio output unit 18 includes a digital/analog (D/A) converter and an audio output terminal or a speaker terminal, and D/A converts, amplifies, and outputs digital audio data supplied from the control unit 11, as an audio signal.

The audio input unit 19 includes an A/D converter and an audio input terminal or a microphone terminal, and A/D converts an audio signal input from outside of the vehicle-mounted to generate digital audio data and supplies the digital audio data to the control unit 11.

The sensor group 201 is used after a second embodiment, and includes a vehicle speed sensor, a steering sensor, a mobile terminal location sensor, etc.

The mobile terminal 20 shown in FIG. 1 includes a mobile phone, a personal handyphone system (PHS), a smart phone, a personal digital assistance (PDA), a portable computer, or the like, and has functions of so-called mobile phones, functions of keyless entry, and functions of BT connection.

Figure 4:
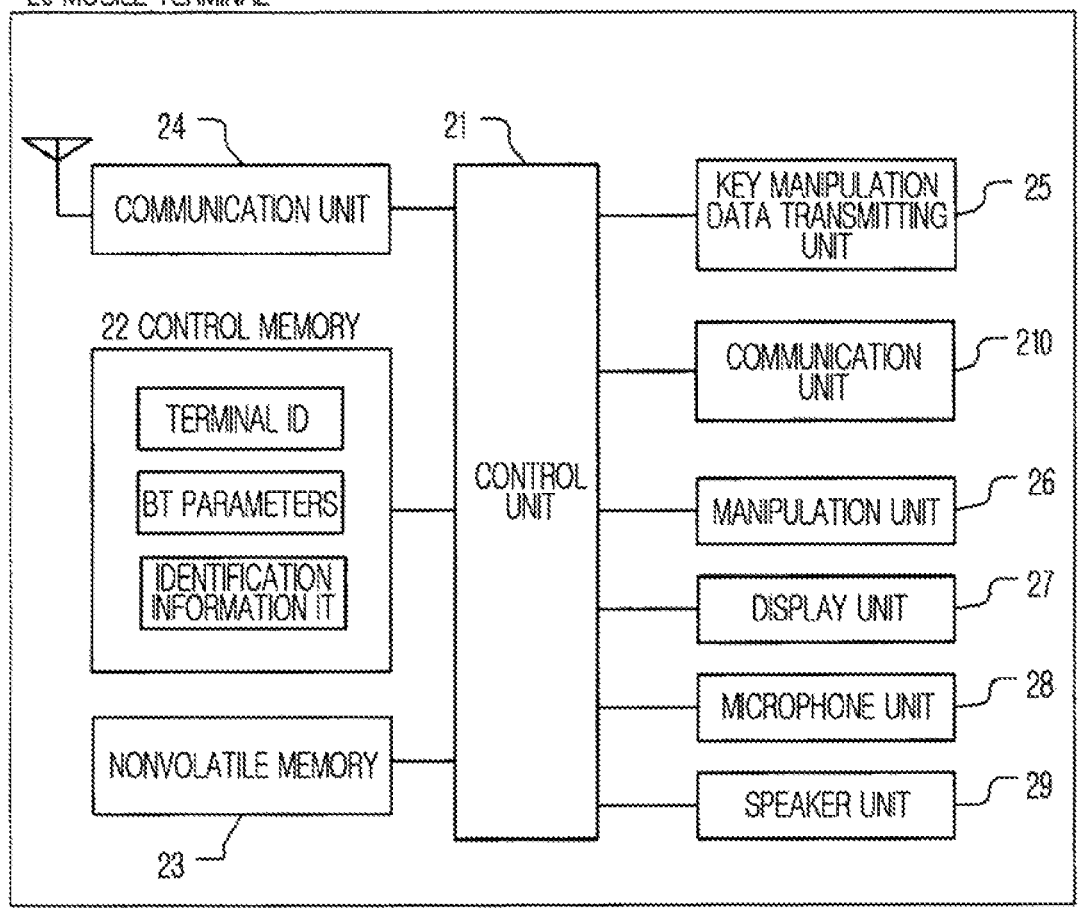
FIG. 4 is a block diagram of a mobile terminal.

The mobile terminal 20 includes, as shown in FIG. 4, a control unit 21, a control memory 22, a nonvolatile memory 23, a communication unit 24, a key manipulation data transmitting unit 25, a manipulation unit 26, a display unit 27, a microphone unit 28, a speaker unit 29, and a communication unit 210.

The control unit 21 includes a CPU or the like, and controls operations of each unit of the mobile terminal 20 by executing operation programs stored in the control memory 22. For example, the control unit 21 performs a process of an audio signal, a display control, etc., a process for a keyless entry in response to a predetermined manipulation, and various controls by establishing a BT connection with the vehicle-mounted apparatus 10 that requested the BT connection.

The control memory 22 includes a read only memory (ROM), a flash memory, a random access memory (RAM), or the like, and functions as a work area of a CPU which forms the control unit 21, a program area which stores operation programs executed by the CPU, a data area, etc.

The program area stores operation programs, such as i) an operation program for executing a general call process, ii) an operation program for performing a keyless entry, iii) a program for establishing a BT connection with the vehicle-mounted apparatus 10, and iv) a program for controlling various functions of the vehicle-mounted apparatus 10 through a BT connection.

The data area, as shown in FIG. 4, stores a terminal ID of a subject device and BT parameters for establishing a BT connection with the vehicle-mounted apparatus 10. Also, the data area of the control memory 22 of the mobile terminal 20 used for the keyless entry stores identification information IT of the keyless entry apparatus 30 to which the keyless entry is approved, in addition to the terminal ID of the subject device and the BT parameters.

The nonvolatile memory 23 includes a flash memory or the like, and stores various pieces of data or various types of content, such as phone numbers and incoming and outgoing call histories.

The communication unit 24 includes an antenna and a BT module, and performs a BT connection with another BT apparatus (in the present embodiment, specifically, the vehicle-mounted apparatus 10).

Under a control of the control unit 21, the key manipulation data transmitting unit 25 transmits key manipulation data including the identification information IT of the keyless entry apparatus 30 and the terminal ID of the subject device.

The manipulation unit 26 includes a manipulation button, a manipulation key, a touch panel, or the like, and supplies a signal indicating manipulation content to the control unit 21 in response to a manipulation by a user.

The display unit 27 includes a liquid crystal display, an organic electro-luminescence (OEL) display, or the like, and displays data under a control of the control unit 21.

The microphone unit 23 is a microphone used during a phone call only using he mobile terminal 20.

The speaker unit 29 is a speaker used when the mobile terminal 20 is used for a phone call.

The communication unit 210 includes an antenna, a high frequency circuit, etc., and performs a mobile communication with a base station.

Figure 5:
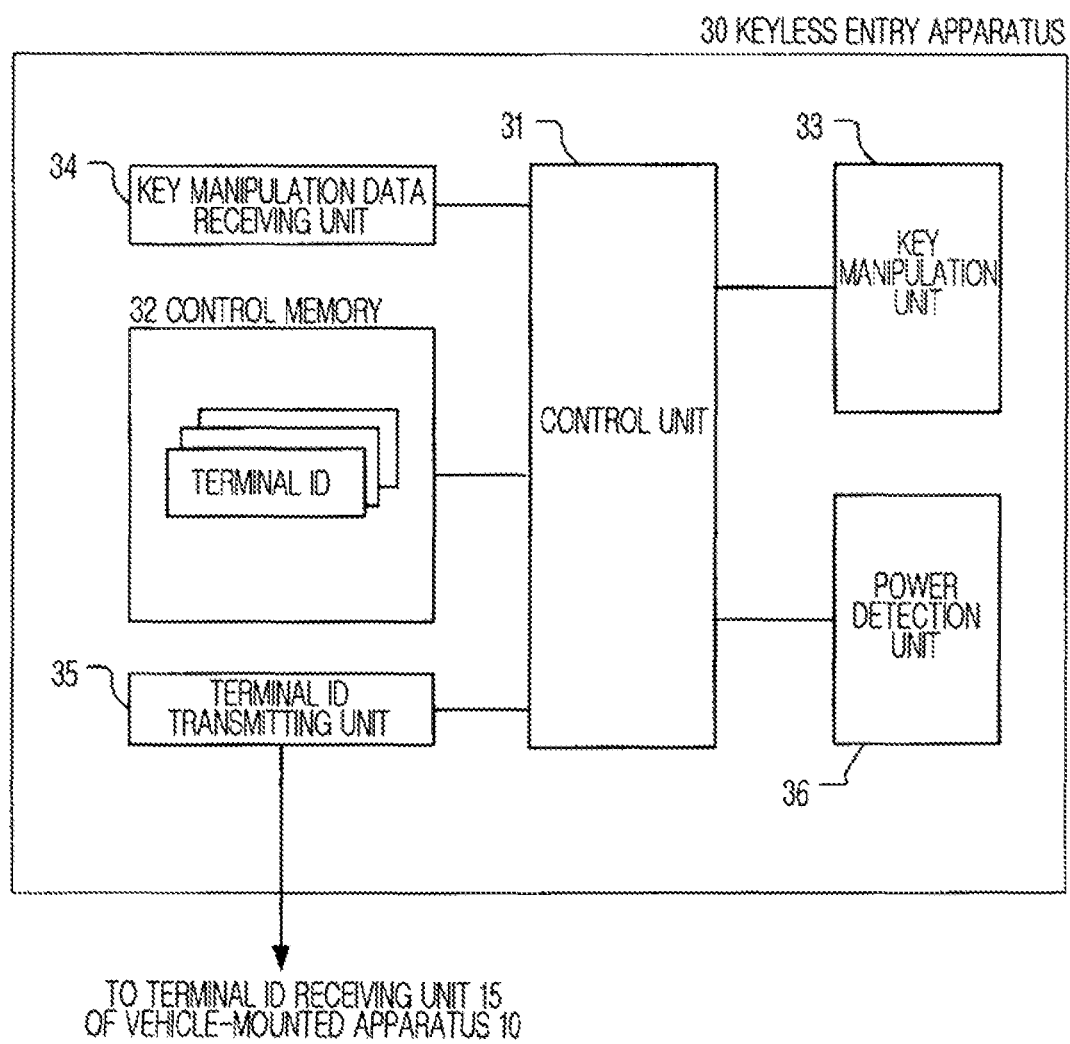
FIG. 5 is a block diagram of a keyless entry apparatus.

The keyless entry apparatus 30 shown in FIG. 1 is an apparatus for locking or unlocking a door of the vehicle 100 via a remote manipulation using the mobile terminal 20. As shown in FIG. 5, the keyless entry apparatus 30 includes a control unit 31, a control memory 32, a key manipulation unit 33, a key manipulation data receiving unit 34, the terminal ID transmitting unit 35, and a power detection unit 36.

The control unit 31 includes a CPU or the like, and controls operations of each unit of the keyless entry apparatus 30 by executing operation programs stored in the control memory 32. For example, when key manipulation data is received from the mobile terminal 20 and predetermined authentication is established, the control unit 31 transmits a control signal for locking or unlocking the door of the vehicle 100 to the key manipulation unit 33, and transmits the terminal ID of the mobile terminal 20, which is included in the key manipulation data, to the vehicle-mounted apparatus 10 through the terminal ID transmitting unit 35.

The control memory 32 includes a ROM, RAM, or the like, and stores a terminal ID of the mobile terminal 20 to which key less entry is permitted, etc. Also, the number of terminal IDs may be one or more.

The key manipulation unit 33 locks or unlocks the door of the vehicle 100 in response to the control signal from the control unit 31.

The key manipulation data receiving unit 34 receives the key manipulation data transmitted from the key manipulation data transmitting unit 25 of the mobile terminal 20 and determines whether the key manipulation data is toward a subject apparatus. If the key manipulation data is toward the subject apparatus the key manipulation data receiving unit 34 notifies the intent to the control unit 31 (transmits a corresponding interrupt signal).

The terminal ID transmitting unit 35 is connected to the terminal ID receiving unit 15 of the vehicle-mounted apparatus 10 via wires, and transmits the terminal ID of the mobile terminal 20, which is included in the received key manipulation data, under a control of the control unit 31.

The power detection unit 36 detects that an ignition of the vehicle 100 is turned on, and supplies a detect signal to the control unit 31.

The hands-free apparatus 40 shown in FIG. 1 includes a headset equipped by a driver, and as shown in FIG. 2, includes a speaker unit 41 and a microphone unit 42. The headset has a hands-free profile (HFP) or a head-set profile (HSP) that is a profile for realizing hands-free communication.

The mobile terminal 20 and the vehicle-mounted apparatus 10 described above also have an HFP or an HSP, and in the present embodiment, a hands-free connection is possible via BT.

Data stored in the control memories 12, 22, and 32 are suitably stored as a default value or according to a manipulation by the user, by using a well-known data registering method.

Next, operations of the automotive communication system 1 having the above construction will be described.

The vehicle-mounted apparatus 10, the keyless entry apparatus 30, and the mobile terminal 20 may each perform general operations.

In the following description, a distinct operation of the present embodiment is described. The distinct operation of the present embodiment is that the vehicle-mounted apparatus 10 is manipulatable via each mobile terminal 20 by establishing a BT connection between the mobile terminal 20 of a passenger of the vehicle 100 and the vehicle-mounted apparatus 10 but a manipulation from the mobile terminal 20 used for a keyless entry (unlock) is not accepted.

Each situation will be described in detail.

(Keyless Entry)

A keyless entry will now be described.

As described above, the terminal ID of the mobile terminal 20 to which the keyless entry is pre-approved is registered in the control memory 22 of the keyless entry apparatus 30. When the user instructs locking or unlocking by manipulating the manipulation unit 26 of the mobile terminal 20 to which the keyless entry is pre-approved, the manipulation unit 26 detects the instruction and outputs the key manipulation data to the control unit 21.

Figure 6:
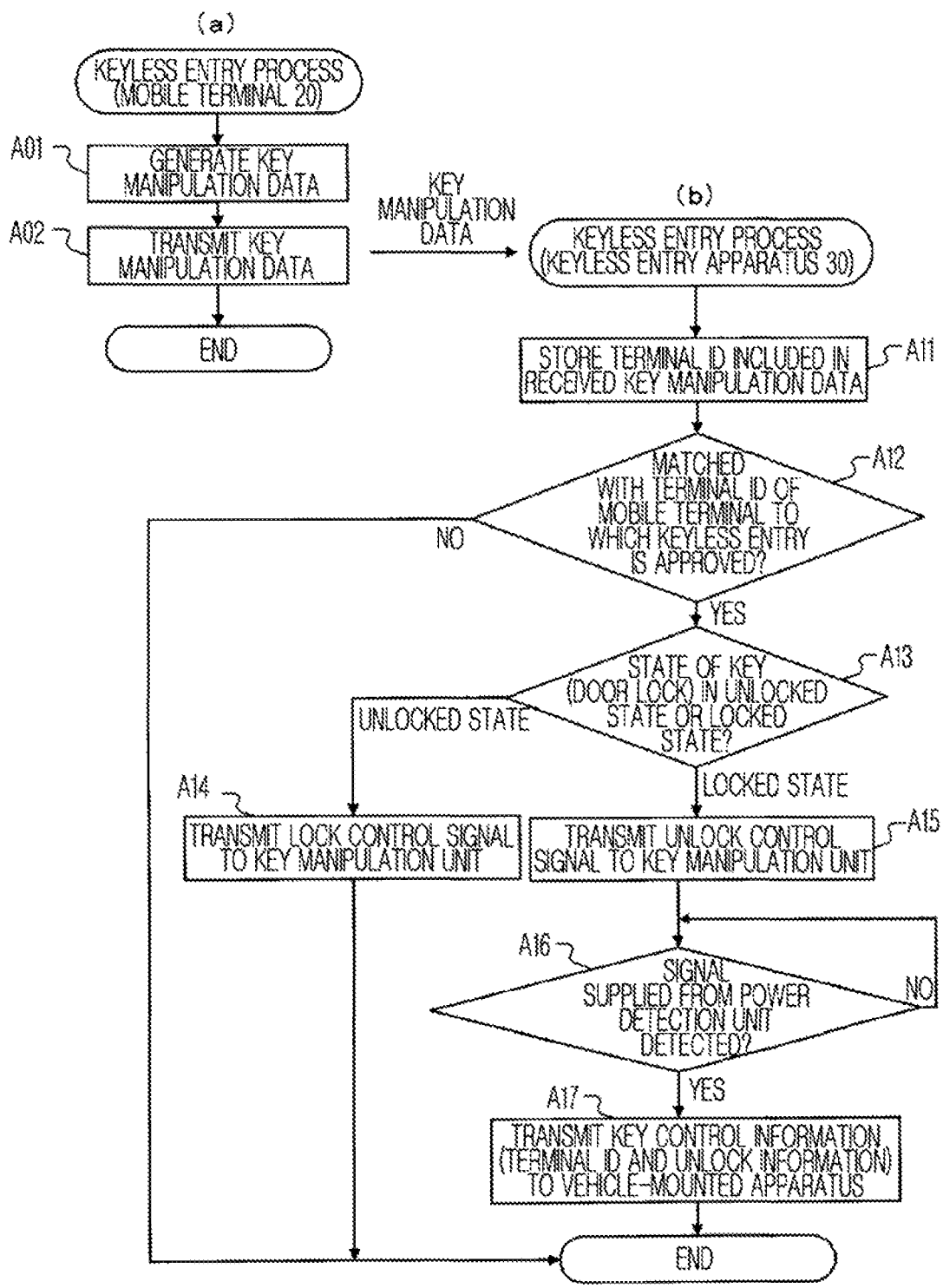
FIG. 6 is a view for showing flowcharts of a keyless entry process, in which FIG. 6 (a) is a flowchart of a keyless entry process performed by a mobile terminal, and FIG. 6 (b) is a flowchart of a keyless entry process performed by a keyless entry apparatus.

The control unit 21 starts a keyless entry process shown in FIG. 6 (a) in response to the key manipulation data, and reads its own terminal ID and identification information (address) IT of the keyless entry apparatus 30 which receives the instruction, from the control memory 22 to generate key manipulation data that uses the identification information IT as a destination address and the terminal ID as a transmitting source address (operation A01).

Then, the control unit 21 wirelessly transmits the generated key manipulation data from the key manipulation data transmitting unit 25 (operation A02), and ends the process.

The key manipulation data receiving unit 34 of the keyless entry apparatus 30 receives the key manipulation data wirelessly transmitted from the key manipulation data transmitting unit 25 and determines whether the destination address (identification information IT) is toward a subject apparatus or not. If the destination address is toward the subject apparatus, reads the received key manipulation data to notify the intent to the control unit 31 (transmits a corresponding interrupt signal).

In response to the notification, the control unit 31 starts a keyless entry process shown in FIG. 6 (b), receives a terminal ID of the mobile terminal 20 of a transmitting source included in the key manipulation data received from the key manipulation data receiving unit 34 and stores the terminal ID in the control memory 32 (operation A11).

The control unit 31 determines whether the received terminal ID matches any one of terminal IDs 12a of the mobile terminals 20 to which the keyless entry is approved, which are pre-stored in the control memory 32 (operation A12). In other words, the control unit 31 authenticates a request of the keyless entry.

When it is determined that the received terminal ID does not match any one of the terminal IDs 12a of the mobile terminals 20 to which the keyless entry is approved, which are pre-stored in the control memory 32 (operation A12; No), the control unit 31 ends the process.

Alternatively, when it is determined that the received terminal ID matches any one of the terminal IDs 12a of the mobile terminals 20 to which the keyless entry is approved, which are pre-stored in the control memory 32 (operation A12; Yes), the control unit 31 determines a current state of a key (a door lock) (operation A13).

When the current state is unlocked (operation A13; unlocked state), the control unit 31 transmits a control signal for locking to the key manipulation unit 33 (operation A14). The key manipulation unit 33 locks the vehicle 100 in response to the control signal and ends the process.

Alternatively, when the current state is locked (operation A13: locked state), the control unit 31 transmits a control signal for unlocking to the key manipulation unit 33 (operation A15).

The key manipulation unit 33 performs an unlock process in response to the control signal.

After unlock is instructed in operation A15, the control unit 31 stands by for the power detection unit 36 to detect a turn-on of an ignition (operation A16). Generally, the user turns on the ignition of the vehicle 100 after the unlock process is performed, by turning an engine key or the like. The power detection unit 36 detects the turn-on of the ignition and outputs a detect signal to the control unit 31.

Also, if the ignition is not turned on or the like even though the control unit 31 stands by for a predetermined time in operation A16, the door key is re-locked and the process is ended.

Then, the control unit 31 transmits key control information including the terminal ID stored in the control memory 32 in operation A11 (i.e., the terminal ID of the mobile terminal 20 that requested the keyless entry) and unlock information indicating the unlock, from the terminal ID transmitting unit 35 to the vehicle-mounted apparatus (operation A17), and ends the process. Alternatively, the control unit 31 may transmit the terminal ID and the unlock information after a predetermined time is measured by an internal timer or the like after outputting the detect signal, or when a data transmit request signal is transmitted to the vehicle-mounted apparatus and then a permission signal is replied back from the vehicle-mounted apparatus 10 in response to the data transmit request signal.

Each unit of the vehicle-mounted apparatus 10 starts to operate as operation power is supplied to the vehicle-mounted apparatus 10 along with the turn-on of the ignition.

The terminal ID receiving unit 15 of the vehicle-mounted apparatus 10 that started to operate receives the key control information including the terminal ID and the unlock information transmitted from the keyless entry apparatus 30 in operation A17, and transmits the key control information to the control unit 11.

Figure 7:
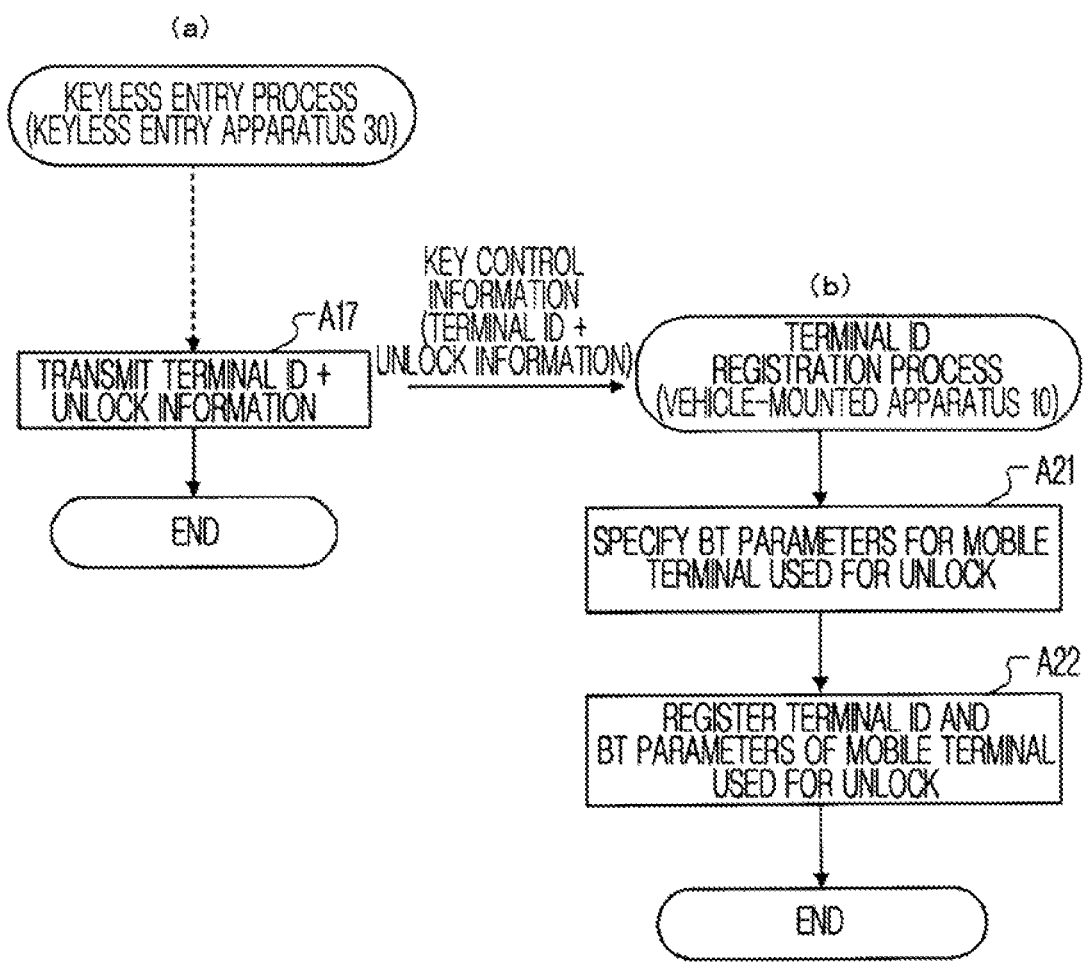
FIG. 7 is a view for showing flowcharts of a keyless entry process, in which FIG. 7 (a) is a flowchart of a part of a keyless entry process performed by a keyless entry apparatus, and FIG. 7 (b) is a flowchart of a terminal identification (ID) registration is process performed by a vehicle-mounted apparatus.

The control unit 11 starts a terminal ID registration process shown in FIG. 7 (b) in response to the receiving of the key control information that includes the terminal ID and the unlock information. The control unit 11 first specifies BT parameters corresponding to the terminal ID included in the received control information (BT parameters required for a BT connection with the mobile terminal 20 used for a unlock manipulation) from the pair 12a of the terminal ID of the mobile terminal to which the keyless entry is approved and the BT parameters, the pair 12a is stored in the control memory 12 (operation A21). Then, the control unit 11 registers a pair of the terminal ID included in the received control information (the terminal ID of the mobile terminal 20 used for unlocking) and the BT parameters for the mobile terminal 20 specified in operation A21, in the control memory 12 as the pair 12c of the terminal ID of the mobile terminal 20 used for unlocking and the BT parameters (operation A22), and ends the process. Here, if the pair 12c of the terminal ID and the BT parameters previously stored is left, the pair 12c is overwritten.

(Establishment of BT Connection)

Figure 8:
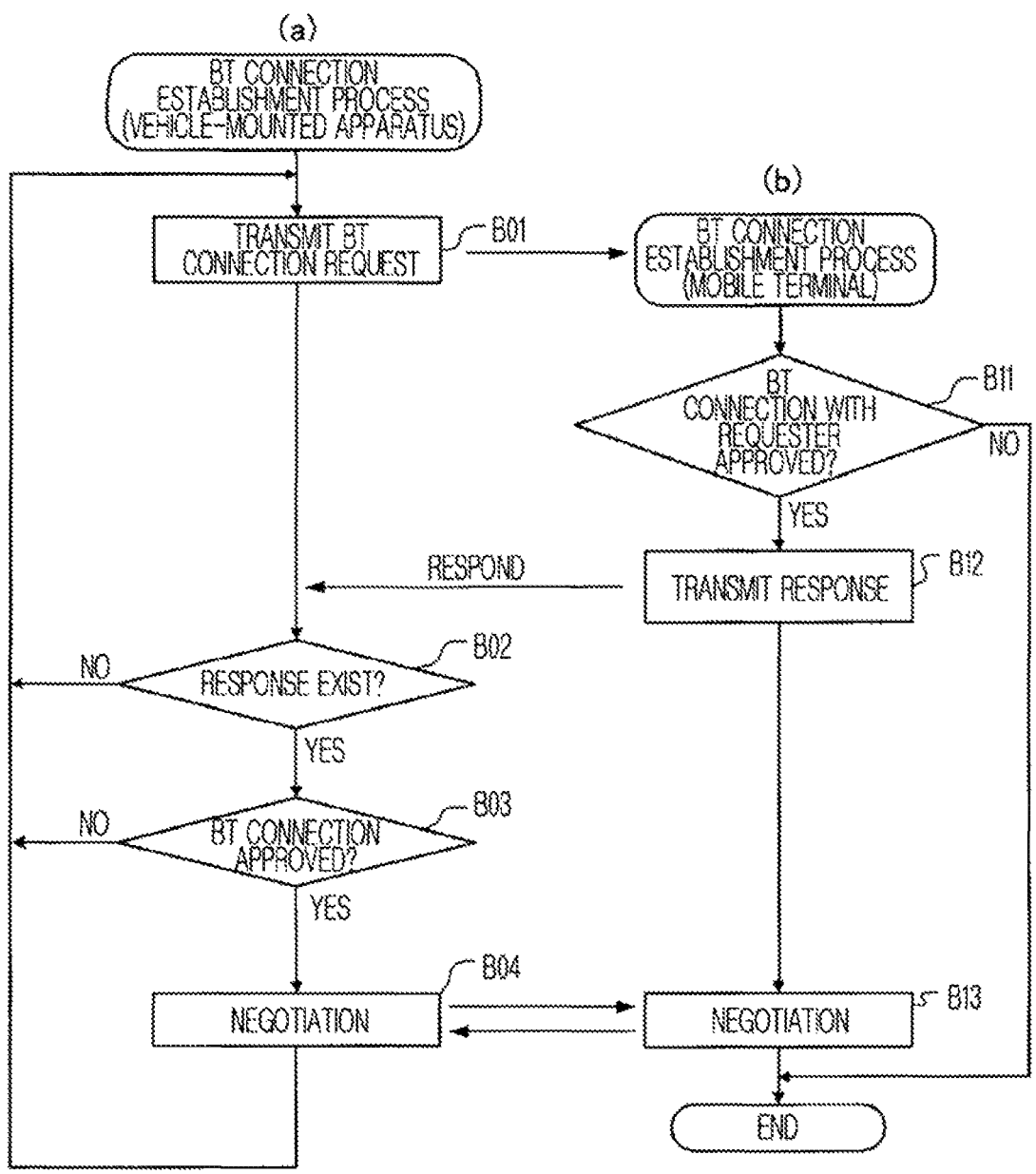
FIG. 8 is a view for showing flowcharts of a keyless entry process, in which FIG. 8 (a) is a flowchart of a Bluetooth (BT (registered trademark, hereinafter omitted)) connection establishment process performed by a vehicle-mounted apparatus, and FIG. 8 (b) is a flowchart of a BT connection establishment process performed by a mobile terminal.

When operation power is supplied, the vehicle-mounted apparatus 10 performs a BT connection establishment process shown in FIG. 8 (a).

First, the control unit 11 transmits a BT connection request to the surrounding mobile terminals 20 through the communication unit 14 (operation B01), and stands by for a response from the mobile terminal 20 (operation B02).

The control unit 21 of the mobile terminal 20 in the vehicle 100 receives the BT connection request from the vehicle-mounted apparatus 10 through the communication unit 24, and starts a BT connection establishment process shown in FIG, 8 (b).

First, the control unit 21 determines whether the vehicle-mounted apparatus 10 that transmitted the BT connection request is an apparatus to which a BT connection is approved, based on BT parameters stored in the control memory 22 (operation B11). In other words, the control unit 21 authenticates an apparatus that transmitted a BT connection request.

When it is determined that the vehicle-mounted apparatus 10 that transmitted the BT connection request is not an apparatus to which the BT connection is approved (operation B11; No), the control unit 21 ends the process. When the response is not obtained within a predetermined time (operation B02; No), the vehicle-mounted apparatus 10 returns to operation B01.

On the other hand, when the control unit 21 of the mobile terminal 20 determines that the vehicle-mounted apparatus 10 that transmitted the BT connection request is an apparatus to which the BT connection is approved (operation B11; Yes), the control unit 21 transmits a response to the connection request (operation B12). The response includes the terminal ID of the mobile terminal 20 that transmitted the response.

On the other hand, the control unit 11 of the vehicle-mounted apparatus 10 receives the response from the mobile terminal 20 through the communication unit 14 (operation B02; Yes) and determines whether the mobile terminal 20 that transmitted the response is the mobile terminal 20 to which the BT connection is approved based on the pair 12b of the terminal ID and the BT parameters pre-stored in the control memory 12 (operation B03).

When it is determined that the mobile terminal 20 that transmitted the response is not the mobile terminal 20 to which the BT connection is approved (operation B03; No), the BT connection establishment process returns to operation B01.

On the other hand, when it is determined that the mobile terminal 20 that transmitted the response is the mobile terminal 20 to which the BT connection is approved (operation B03; Yes), a negotiation is performed between the control unit 11 of the vehicle-mounted apparatus 10 and the control unit 21 of the mobile terminal 20 through the communication units 14 and 24 (operations B04 and B13), and a corresponding setting is performed by establishing the BT connection between the vehicle-mounted apparatus 10 and the mobile terminal 20.

For example, when a headset profile (HSP) and a hands-free profile (HFP) are set as BT parameters between the vehicle-mounted apparatus 10 and a certain mobile terminal 20 to realize a hands-free call, the vehicle-mounted apparatus 10 and the certain mobile terminal 20 perform various settings such that outgoing and incoming communication and a phone call are possible through the hands-free apparatus 40 once the BT connection is established.

If required, the control unit 11 of the vehicle-mounted apparatus 10 and the control unit 21 of the mobile terminal 20 display a intent of connection completion respectively on the display unit 17 and the display unit 27 and output audio notification respectively from the audio output unit 18 and the speaker unit 29, when the BT connection is established.

Then, the process returns to operation B01 and BT connections are sequentially established with the surrounding mobile terminals 20 to which the BT connection is pre-approved. Also, if there is a mobile terminal 20 that is unable to BT communicate when more than a predetermined time has passed since the BT connection is established, the BT connection with the mobile terminal 20 is disconnected.

Afterwards, several processes are performed through the BT connection.

Also, a request for a BT connection from the mobile terminal 20 to the vehicle-mounted apparatus 10, and a following BT connection process are suitably performed.

Here, when the vehicle-mounted apparatus 10 is manipulated (controlled) by using the mobile terminal 20 that established a BT connection with the vehicle-mounted apparatus 10, a user activates an operation program stored in the control memory 22 (a program for controlling various functions of the vehicle-mounted apparatus 10 through the BT connection), via a predetermined key manipulation or the like. Alternatively, the operation program may be automatically activated in response to the establishment of the BT connection (operation B13).

Figure 9:
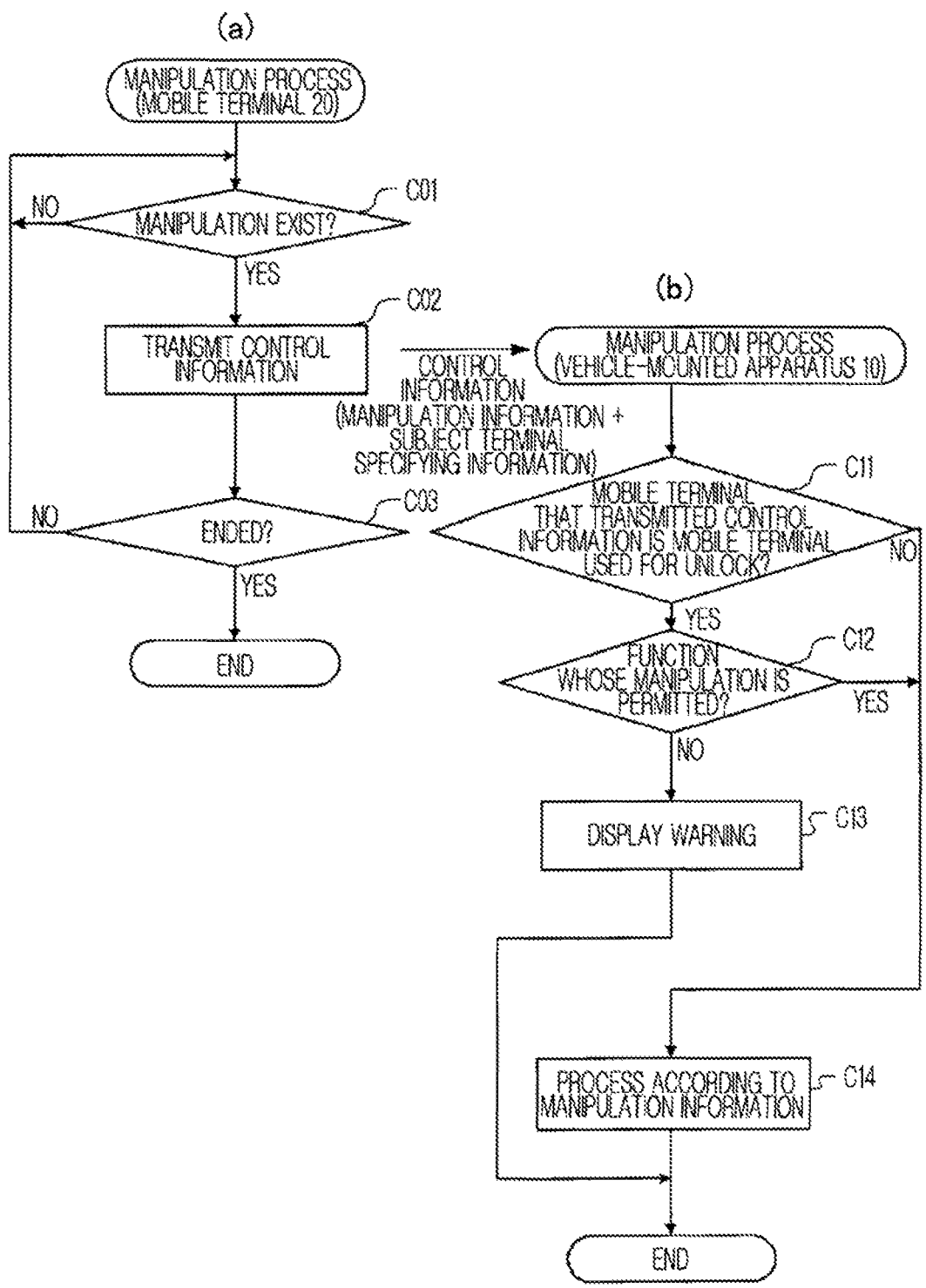
FIG. 9 is a view for showing flowcharts of a manipulation process, in which FIG. 9 (a) is a flowchart of a manipulation process performed by a mobile terminal, and FIG. 9 (b) is a flowchart of a manipulation process performed by a vehicle-mounted apparatus.

By activating the operation program, the control unit 21 of the mobile terminal 20 starts a manipulation process shown in FIG. 9 (a), and first determines whether any manipulation is performed or not (operation C01). When it is determined that there is no manipulation (operation C01; No), operation C01 is repeated, and the manipulation process stands by for the user to input a manipulation.

On the other hand, when it is determined that there is a manipulation (instruction) (operation C01; Yes), the control unit 21 transmits control information, including manipulation information indicating a content of the manipulation (instruction) and information specifying the subject terminal, to the vehicle-mounted apparatus 10 through the communication unit 24 (operation C02). Also, the manipulation information may include information which indicates the key manipulation itself, for example, manipulating a right cursor or information which indicates content of a process instructed via a key manipulation. Then, it is determined whether the process is ended (operation C03), and when the process is not ended (operation C03; No), the process returns to operation C01 to repeat the above processes. On the other hand, when it is determined that the process is ended (operation C03; Yes), the process is ended.

The control unit 11 of the vehicle-mounted apparatus 10 receives control information (manipulation information+information specifying the subject terminal) transmitted in operation C02 through the communication unit 14, and starts a manipulation process shown in FIG. 9 (*b*).

First, the control unit 11 determines whether the mobile terminal 20 that transmitted the control information is the mobile terminal 20 used for unlock (keyless entry), based on the pair 12*c* of the terminal ID of the mobile terminal used for unlock and the BT parameters, which is stored in the control memory 12 (operation C11).

When the BT parameters of the mobile terminal 20 used for unlock are not stored in the control memory 12 (when unlock is performed via other than a keyless entry) and when the BT parameters of the mobile terminal 20 that transmitted the control information do not match the BT parameters of the mobile terminal for unlock stored in the control memory 12 (operation C11; No), the mobile terminal 20 that transmitted the control information is not the mobile terminal 20 used for unlock. Accordingly, the control unit 11 performs a process according to a manipulation indicated by the received control information (operation C14).

On the other hand, since the mobile terminal 20 that transmitted the control information is the mobile terminal 20 used for unlock when the BT parameters of the mobile terminal 20 that transmitted the control information match the BT parameters of the mobile terminal used for unlock stored in the control memory 12 (operation C11; Yes), the control unit 11 determines whether a manipulation specified by the manipulation information included in the received control information is a manipulation directed to a permitted function, based on the manipulation permission/prohibition table 12*d* (FIG. 3) stored in the control memory 12 shown in FIG. 2 (operation C12).

When it is a function in which manipulation is permitted (operation C12; Yes), for example, when the manipulation corresponding to the manipulation information is for turning on of a data recorder function, since a manipulation of a data recorder function is permitted in the manipulation permission/prohibition table 12*d* of FIG. 3, it is determined Yes in operation C12, and thus the data recorder function is turned on in operation C14.

On the other hand, when it is a function in which manipulation is prohibited (operation C12; No), for example, when the manipulation corresponding to the manipulation information is for setting a destination in a car navigation or adjusting a volume of audio, since a manipulation of a car navigation function or audio function is prohibited in the manipulation permission/prohibition table 12*d* of FIG. 3, it is determined No in operation C12, and for example, a warning shown in FIG. 10 is displayed on the display unit 17 in operation C13, and the process is ended.

As described above, in the present embodiment, it is possible to prohibit a manipulation of the vehicle-mounted apparatus 10 using the mobile terminal 20 used for a keyless entry (unlock). Accordingly, since the keyless entry, specifically, unlocking, is often performed by a driver, a manipulation that is not preferable to be done by the driver may be prohibited efficiently by using a simple configuration with less false operation.

Also, the present invention is not limited to he above embodiment, and may be variously modified and applied.

For example, in the manipulation permission/prohibition table 12*d* shown in FIG. 3, permission and prohibition are set according to large classifications of functions of the vehicle-mounted apparatus 10 (basic functions), but alternatively, permission and prohibition may be set according to detailed functions as shown in FIG. 11. Also, permission/prohibition may be controlled for other functions than those shown in FIG. 3 or 11. For example, permission/prohibition may be controlled with respect to functions of manipulating a mobile terminal itself, calls and Internet browsing, or activation/use of an entertainment-based application may be limited by a manipulation of a mobile terminal. Also, limitations, such as prohibiting transmitting of image data, may be performed.

2. Second Embodiment

In the first embodiment, the vehicle-mounted apparatus 10 determined whether the manipulation indicated by the manipulation information included in the control information is permitted or prohibited (operation C12), under the condition that the mobile terminal 20 that transmitted the control information is the mobile terminal 20 used for the keyless entry (unlock) (operation C11; Yes). The present invention is not limited thereto and another arbitrary condition may be added as a condition for determining whether a manipulation is permitted or prohibited.

For example, as shown in FIG. 12, when it is determined that the mobile terminal 20 that transmitted the control information is the mobile terminal 20 used for the keyless entry (unlock) (operation C11; Yes), it is determined whether the mobile terminal 20 is in a call state (operation C21). When it is determined that the mobile terminal 20 is in a call state (operation C21; Yes), it may determined whether the manipulation indicated by the manipulation information included in the control information is permitted or prohibited (operation C12).

Here, the call state is not limited to a state where the mobile terminal 20 is actually used for a call. For example, when the mobile terminal 20 and the vehicle-mounted apparatus 10 are BT-connected based on the headset profile (HSP) and the hands-free profile (HFP) to realize a hands-free call, a call may be made by using the mobile terminal 20 through the hands-free apparatus 40 if required.

Thus, the call state may be determined when the mobile terminal 20 and the vehicle-mounted apparatus 10 are BT-connected under a communicationable state.

According to such a configuration, since a predetermined manipulation process is prohibited when the mobile terminal 20 is used for the keyless entry (unlock) and is in a call state, it is possible to prohibit a very unpreferable manipulation by the driver or the like, and thus a situation where manipulations that are not harmful are all prohibited may be prevented.

3. Third Embodiment

In the second embodiment, it was determined whether the manipulation indicated by the manipulation information included in the received control information is permitted or prohibited (operation C12) under the premise that the mobile terminal 20 is the mobile terminal 20 used for the keyless entry (unlock) (operation C11; Yes) and, the condition that the mobile terminal is in the call state (operation C21; Yes). However, for example, manipulations using the mobile terminal 20 may not be all prohibited when it is obvious that the driver is not driving since the vehicle 100 has stopped.

Figure 13A:
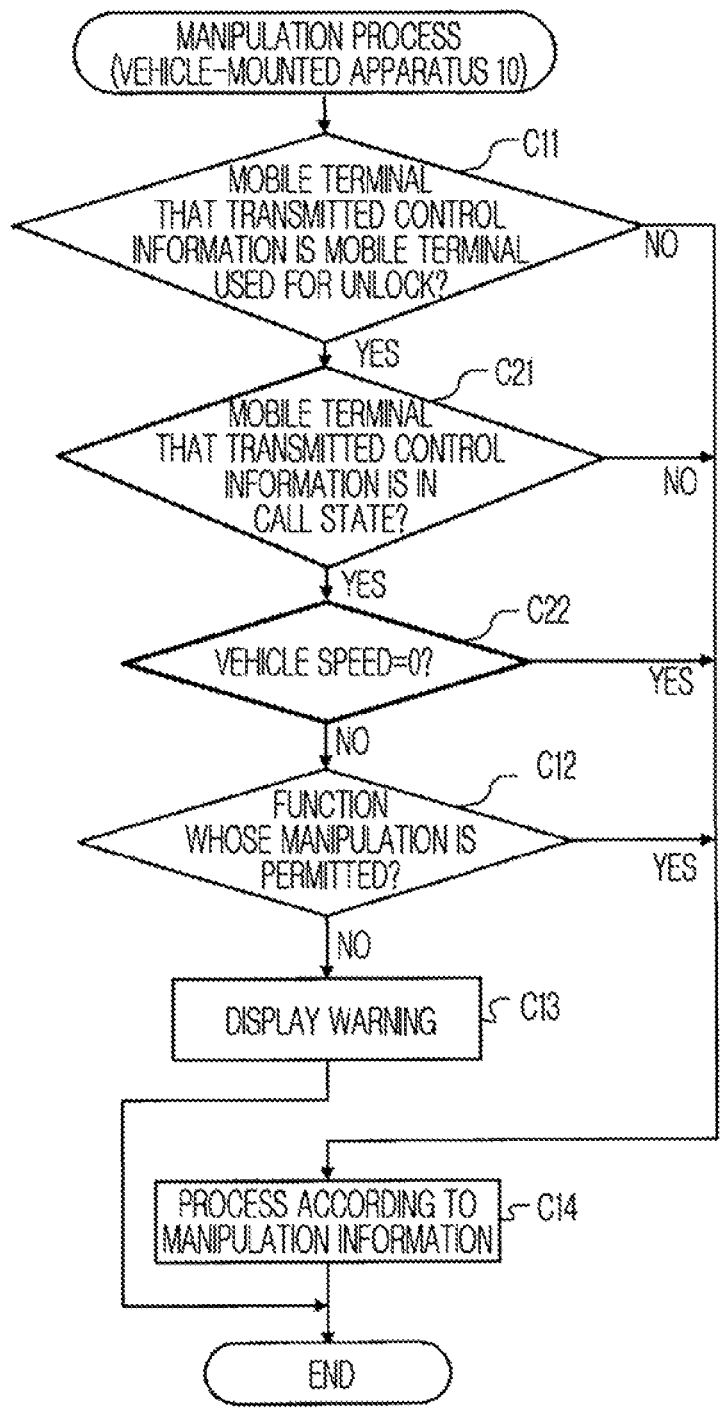
FIGS. 13A and 13B are flowcharts of a manipulation process performed by a vehicle-mounted apparatus, according to a third embodiment.
Figure 13B:
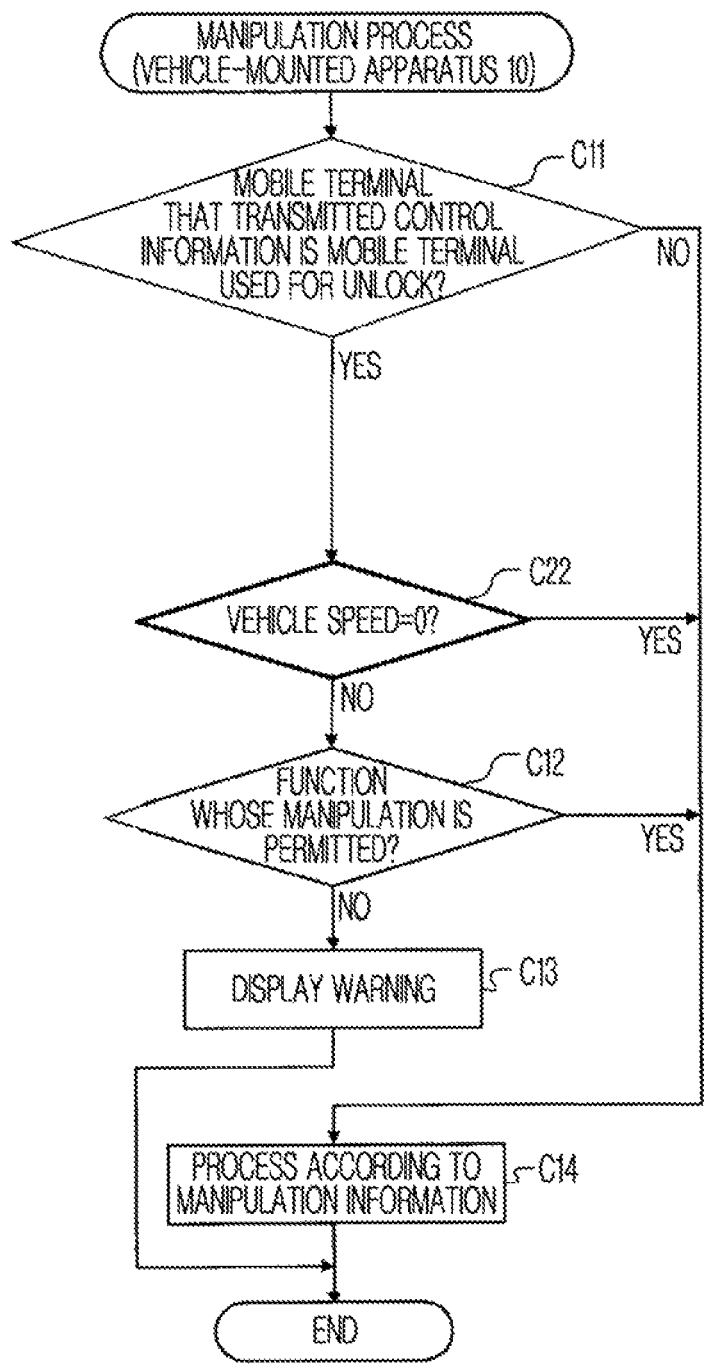

Thus, as shown in FIG. 13A, when the call state is determined (operation C21; Yes) in operation C21, a vehicle speed may be determined from an output of a vehicle speed sensor of the sensor group 201 (operation C22). When the vehicle speed is 0 (i.e., in a stop state) (operation C22; Yes), a process based on the manipulation information may be permitted (operation C14), and when the vehicle speed is not 0 (i.e., in a driving state) (operation C22; No), it may be determined whether to permit or prohibit the process based on the manipulation information (operation C12).

Alternatively, as shown in FIG. 138, operation C21 may be skipped.

Here, instead of strictly determining whether the vehicle speed is 0 in operation C22, it may be determined whether the vehicle speed is lower than a predetermined speed, for example, about 3 km/hour (the vehicle speed may be considered to be practically 0).

Figure 14A:
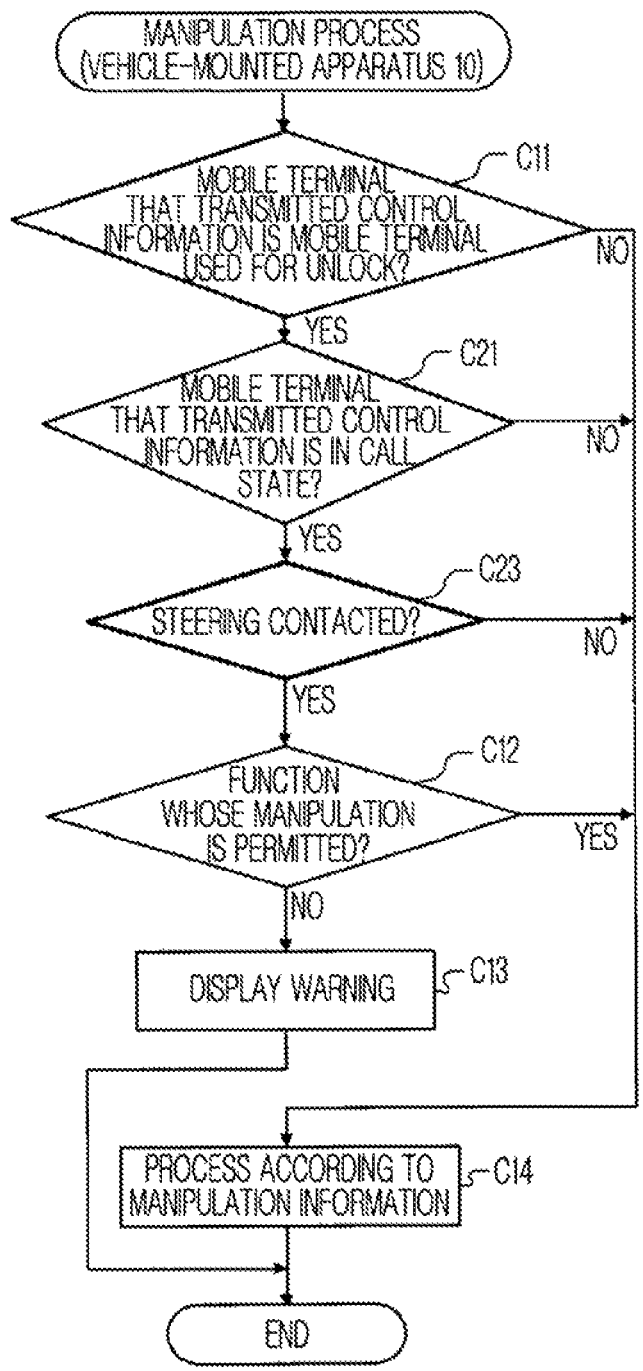

On the other hand, as shown in FIG. 14A, when the call state is determined (operation C21; Yes) in operation C21, it may be determined whether the driver is contacting a steering from an output of a steering touch sensor of the sensor group 201 (operation C23). When the driver is not contacting the steering (i.e., when the driver is not driving) (operation C23; No), the process based on the manipulation information included in the received control information may be permitted. On the other hand, when the driver is contacting the steering (i.e., when the driver is driving) (operation C23; Yes), it may be determined whether to permit or prohibit the process based on the manipulation information (operation C12).

Alternatively, as shown in FIG. 14B, operation C21 may be skipped.

Alternatively, as shown in FIG. 15A, when the call state is determined (operation C21; Yes) in operation C21, it may be determined whether the driver is sitting from an output of a sitting sensor of the sensor group 201 (operation C24). When the driver is not sitting (i.e., when the driver is not driving) (operation C24; No), the process based on the manipulation information included in the received control information may be permitted (operation C14). Otherwise, when the driver is sitting (i.e., when the driver is highly likely to be driving) (operation C24; Yes), it may be determined whether to permit or prohibit the process based on the manipulation information (operation C12).

Alternatively, as shown in FIG. 15B, operation C21 may be skipped.

Alternatively, as shown in FIG. 16A, when the call state is determined (operation C21; Yes) in operation C21, it may be determined whether the mobile terminal 20 that transmitted the manipulation information is held by the driver (on or near the driver's seat) from an output of a mobile terminal location sensor of the sensor group 201 (operation C25). When the mobile terminal 20 is located somewhere other than the driver's seat (i.e., when the mobile terminal 20 is not held by the driver) (operation C25; No), the process based on the manipulation information is permitted. Otherwise, when the mobile terminal 20 is on the driver's seat (i.e., when the mobile terminal 20 is held by the driver) (operation C25; Yes), it may be determined whether to permit or prohibit the process (operation C14) based on the manipulation information (operation C12). A method of determining whether the mobile terminal 20 is held by the driver (whether the mobile terminal 20 is on or near the drivers seat) may be, for example, a method disclosed in Patent Document 1.

Figure 16B:
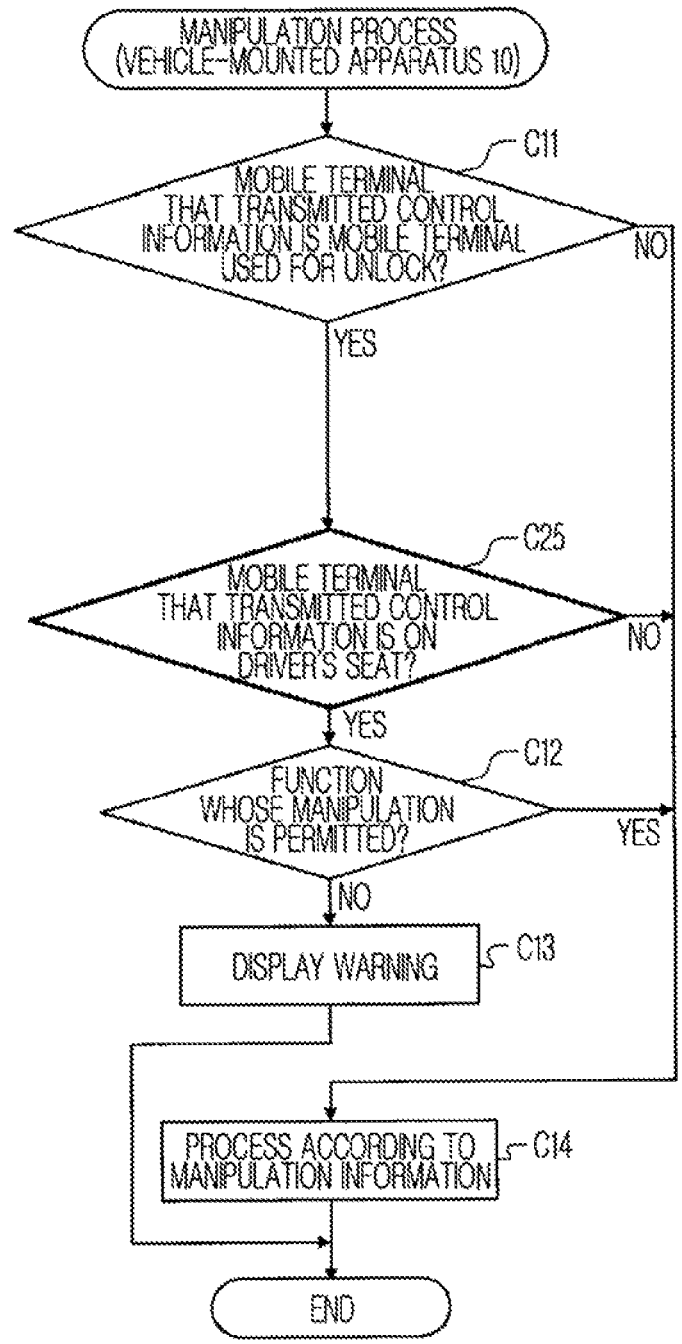

Alternatively, as shown in FIG. 16B, operation C21 may be skipped.

4. Fourth Embodiment

In the above embodiments, the condition that the mobile terminal 20 is the mobile terminal 20 used for the keyless entry (unlock) (operation C11; Yes) is used as an essential condition for determining whether to permit or prohibit the manipulation corresponding to the manipulation information, but another condition may be used as an essential condition and the condition that the mobile terminal 20 is the mobile terminal 20 used for the keyless entry (unlock) may be an additional condition.

Figure 17:
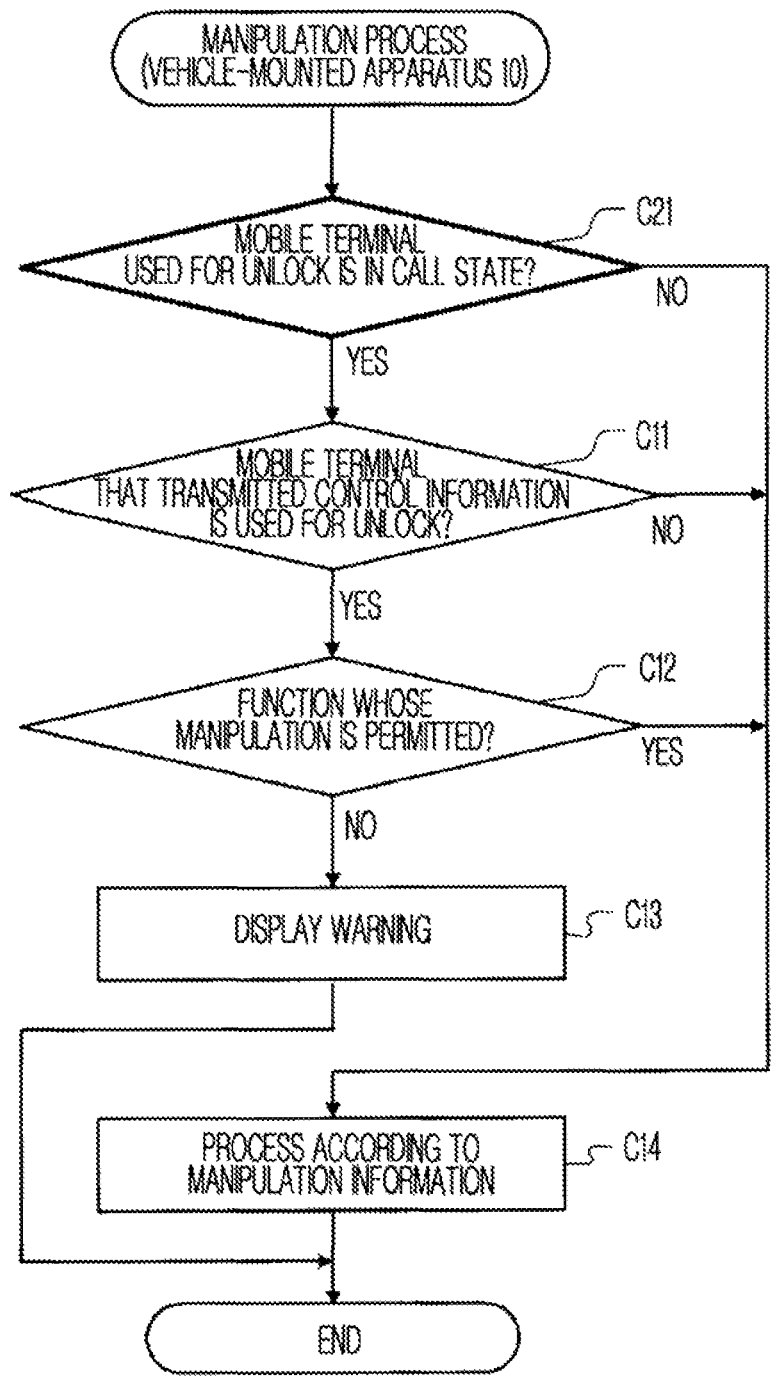
FIG. 17 is a flowchart of a manipulation process performed by a vehicle-mounted apparatus, according to a fourth embodiment.

For example, as shown in FIG. 17, it may be determined whether the mobile terminal 20 used for the unlock is in the call state (operation C21), and when the call state is determined (operation C21; Yes), it may be determined whether the mobile terminal 20 that transmitted the control information is the mobile terminal used for the keyless entry (unlock) (operation C11).

Alternatively, as shown in FIGS. 18A and 18B, it may be determined whether a mobile terminal 20 that transmitted the control information is held by the driver (on the driver's seat) from the output of the mobile terminal location sensor of the sensor group 201 (operation C25), and when the mobile terminal 20 is on the driver's seat (i.e., held by the driver) (operation C25; Yes), it may be determined whether the mobile terminal in the call state or used for the unlock (operations C21 or C11).

Determining whether the driver is driving may be used as an essential condition.

5. Fifth Embodiment

In the above embodiments, the condition that the mobile terminal 20 is the mobile terminal 20 used for the keyless entry (unlock) (operation C11; Yes) is used as a condition for determining whether the manipulation corresponding to the manipulation information is permitted or prohibited, but another condition may be used to determine whether the manipulation corresponding to the manipulation information is permitted or prohibited.

Figure 19B:
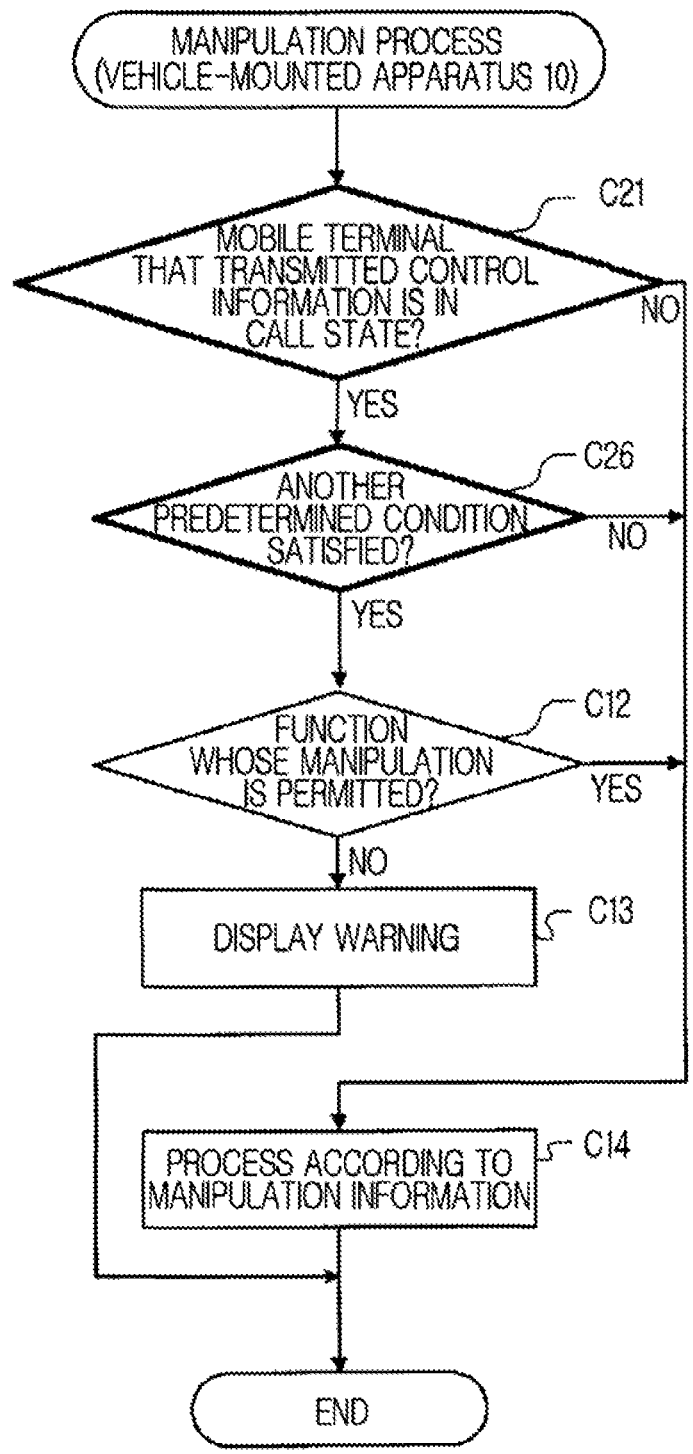

For example, as shown in FIG. 19 (a), it may be determined whether the mobile terminal 20 that transmitted the control information is in the call state (operation C21), and when the call state is determined (operation C21; Yes), it may be determined whether the manipulation corresponding to the manipulation information is permitted or prohibited (operation C12).

Alternatively, as shown in FIG. 19 (b), another additional condition (operation C26), for example, whether the mobile terminal 20 that transmitted the control information is held by the driver (on the driver's seat) or whether the driver is driving, may be added.

Also, as shown in FIG. 20, additional conditions may be set according to types or content of manipulations.

6. Modified Example

In the embodiments described above, the vehicle-mounted apparatus 10 and the mobile terminal 20 perform wireless communication satisfying BT specifications, but alternatively, communication based on another short-range wireless communication standard, such as ultra wide band (UVVB), z-wave, or ZigBee, may be used.

The vehicle-mounted apparatus 10 and the keyless entry apparatus 30 are connected via a wired cable, but they may be connected wirelessly.

Also, the vehicle-mounted apparatus 10 and the keyless entry apparatus 30 are individual apparatuses, but their circuits may be shared to integrate them.

Also, in the above embodiments, the keyless entry apparatus 30 transmits a terminal ID to the vehicle-mounted apparatus 10 only when the keyless entry apparatus 30 is unlocked, but alternatively, the terminal ID may be transmitted regardless of a result.

At this time, the terminal ID of the mobile terminal to be BT-connected, which is stored in the control memory 12 of the vehicle-mounted apparatus 10, may not be necessarily a keyless entry target and may be arbitrary.

In the above embodiments, the keyless entry apparatus 30 unlocks or locks a key, but a keyless entry is not limited to unlocking or locking a key, and alternatively, the keyless entry may turn on or off an ignition. At this time, the power detection unit 36 may not detect the turn-on of the ignition, and the control unit 31 may not stand by for the detection in operation A16 of FIG. 5 (*b*). Also, standby power may be supplied to the terminal ID receiver 15 and the control unit 11 of the vehicle-mounted apparatus 10 even during turn-off of the ignition.

Also, the keyless entry apparatus 30 is used as a means for specifying the mobile terminal 20 that manipulated (or showed an intention of manipulating) the vehicle 100, but alternatively, another vehicle control apparatus may be used. For example, the vehicle control apparatus may be a remote engine start apparatus or the like that is operated according to a remote control by the mobile terminal 20. In this case, a command of instructing to start an engine is transmitted via a manipulation of the mobile terminal 20.

When a terminal ID is registered, the remote engine start apparatus turns on an ignition and starts an engine to start idling. Then, the remote engine start apparatus transmits the terminal ID to the vehicle-mounted apparatus 10. When the terminal ID is determined to be registered, the vehicle-mounted apparatus 10 requests for a BT connection with the mobile terminal 20 that instructed to start the engine. Similarly, a manipulation of the mobile terminal 20 for instructing a vehicle may be opening or closing a window, opening or closing a side view mirror, or the like. Alternatively, an intention of the user may be suitably checked as long as an apparatus capable of remotely transmitting an arbitrary command to a vehicle and a vehicle control apparatus capable of controlling the vehicle upon receiving the arbitrary command are used.

In the above embodiments, the keyless entry apparatus 30 received and transmitted the terminal ID to the vehicle-mounted apparatus 10, but alternatively, the vehicle-mounted apparatus 10 itself may include a key manipulation data receiving unit to intercept key manipulation data transmitted from the mobile terminal 20 to the keyless entry apparatus 30, so as to control whether to establish a BT connection based on whether a terminal ID included in the key manipulation data is pre-registered in the control memory 12. Here, a means and method of receiving a terminal ID of the mobile terminal 20 that performed a manipulation with respect to a vehicle are arbitrary.

Also, the terminal ID transmitted by the mobile terminal 20 and the terminal ID stored in the keyless entry apparatus 30 and vehicle-mounted apparatus 10 may not be the same. Data itself is arbitrary as long as it is checked that the terminal IDs are assigned by the same mobile terminal 20 via a predetermined process. For example, in a vehicle-mounted apparatus that requires lock release while being activated/used for security, a mobile terminal used for the lock release may be determined to be a mobile terminal of a driver. The same principle applies when a terminal ID of a mobile terminal is used for lock release of a vehicle-mounted apparatus. Also, when near field communication (NFC) or the like is provided in both a vehicle-mounted apparatus and a mobile terminal, a system or the like in which a lock is released when a a vehicle-mounted apparatus approaches a pre-registered mobile terminal may be considered, and thus it may be determined that the mobile terminal used for the lock release is held by a driver.

Also, a program executed to realize the present invention is pre-stored in the control memories 12, 22, and 32, or the like, but alternatively, such an operation program and various pieces of data may be distributed or provided to a computer included in the vehicle-mounted apparatus 10, the mobile terminal 20, or the keyless entry apparatus 30 by a detachable recording medium. Alternatively, the operation program and various pieces of data may be distributed by being downloaded from another device connected through an electric communication network or the like.

Also, each process may not only be executed by providing the detachable recording medium, but executed by storing an operation program and various pieces of data downloaded through an electric communication network or the like in a built-in storage apparatus or directly executed by using a hardware resource of another device connected through an electric communication network or the like. Furthermore, each process may be executed by exchanging various pieces of data with another device through an electric communication network or the like.

However, the present invention is not limited to the above embodiments and the drawings. It is possible to suitably change (including omitting an element) the embodiments and the drawings without changing the scope of the present invention. For example, some operations of the vehicle-mounted apparatus 10 may be performed by the mobile terminal 20.

According to the present invention, it is possible to suitably control a co-operation between a mobile terminal and a vehicle-mounted apparatus via a simple structure.

What is claimed is:

1. A vehicle-mounted apparatus which is mounted on a vehicle having a keyless entry unit which receives a signal instructing a keyless entry from a mobile terminal and performs a keyless entry process in response to the received signal, the vehicle-mounted apparatus comprising:

a communication unit which is configured to receive, from a mobile terminal, control information including manipulation information indicating manipulation content for controlling the vehicle-mounted apparatus and information specifying the mobile terminal;

a terminal determination unit which is configured to determine whether the mobile terminal that transmitted the control information is the mobile terminal used for the keyless entry;

a manipulation acceptance determination unit which is configured to determine not to accept manipulation specified by the manipulation information received from the mobile terminal, if the mobile terminal is determined by the terminal determination unit to have been used for the keyless entry;

a call state determination unit which is configured to determine whether the mobile terminal that transmitted the control information is performing a communication connection with the vehicle-mounted apparatus for a call, wherein the manipulation acceptance determination unit is configured to determine not to accept manipulation specified by the manipulation information received from the mobile terminal, if the mobile terminal is determined by the terminal determination unit to have been used for the keyless entry and is determined by the call state determination unit to be performing the communication connection for the call, and the mobile terminal is held by a driver on the driver seat when the vehicle is in a driving state, and a processing unit which is configured to perform a process corresponding to the manipulation determined to be accepted by the manipulation acceptance determination unit and is configured not to perform a process corresponding to the manipulation determined not to be accepted by the manipulation acceptance determination unit.

2. The vehicle-mounted apparatus of claim 1, further comprising a vehicle speed determination unit which is configured to determine whether a speed of the vehicle is higher than a predetermined value, wherein the manipulation acceptance determination unit is configured to determine not to accept manipulation specified by the manipulation information received from the mobile terminal, if the mobile terminal is determined by the terminal determination unit to have been used for the keyless entry and is determined by the call state determination unit to be performing the communication connection for the call, and the mobile terminal is held by a driver on the driver seat when the speed of the vehicle is determined by the vehicle speed determination unit to be higher than the predetermined value.

3. The vehicle-mounted apparatus of claim 1, further comprising a steering touch determination unit which is configured to determine whether a steering of the vehicle is touched, wherein the manipulation acceptance determination unit is configured to determine not to accept manipulation specified by the manipulation information received from the mobile terminal, if the mobile terminal is determined by the terminal determination unit to have been used for the keyless entry and is determined by the call state determination unit to be performing the communication connection for the call, the mobile terminal is held by a driver when the vehicle is in a driving state, and the steering of the vehicle is determined by the steering touch determination unit to be touched.

4. The vehicle-mounted apparatus of claim 1, further comprising a sitting determination unit which is configured to determine whether a driver's seat of the vehicle is occupied, wherein the manipulation acceptance determination unit is configured to determine not to accept manipulation specified by the manipulation information received from the mobile terminal, if the mobile terminal is determined by the terminal determination unit to have been used for the keyless entry and is determined by the call state determination unit to be performing the communication connection for the call, the mobile terminal is held by a driver when the vehicle is in a driving state, and the driver's seat of the vehicle is determined by the sitting determination unit to be occupied.

5. A method of controlling a vehicle-mounted apparatus, the method comprising:

receiving a signal instructing a keyless entry from a mobile terminal and performing a keyless entry process in response to the received signal;

receiving, from a mobile terminal, control information including manipulation information indicating manipulation content for controlling the vehicle-mounted apparatus and information specifying the mobile terminal;

determining whether the mobile terminal that transmitted the control information is the mobile terminal used for the keyless entry;

determining whether the mobile terminal that transmitted the control information is performing a communication connection with the vehicle-mounted apparatus for a call;

determining not to accept manipulation specified by the manipulation information received from the mobile terminal, if the mobile terminal is determined to have been used for the keyless entry and is determined to be performing the communication connection for the call, and the mobile terminal is held by a driver on the driver seat when the vehicle is in a driving state; and performing a process corresponding to the manipulation determined to be accepted, wherein a process corresponding to the manipulation determined not to be accepted is not performed.

6. A non-transitory computer readable storage medium having recorded thereon a computer program for executing a computer process on a computer, the computer process comprising:

receiving a signal instructing a keyless entry from a mobile terminal and performing a keyless entry process in response to the received signal;

receiving, from a mobile terminal, control information comprising manipulation information indicating manipulation content for controlling a vehicle-mounted apparatus and information specifying the mobile terminal;

determining whether the mobile terminal that transmitted the control information is the mobile terminal used for the keyless entry;

determining whether the mobile terminal that transmitted the control information is performing a communication connection with the vehicle-mounted apparatus for a call;

determining not to accept manipulation specified by the manipulation information received from the mobile terminal, if the mobile terminal is determined to have been used for the keyless entry and is determined to be performing the communication connection for the call, and the mobile terminal is held by a driver on the driver seat when the vehicle is in a driving state; and performing a process corresponding to the manipulation determined to be accepted, wherein a process corresponding to the manipulation determined not to be accepted is not performed.

* * * * *